(12) United States Patent
Wenren et al.

(10) Patent No.: US 11,656,444 B2
(45) Date of Patent: May 23, 2023

(54) ZOOM LENS GROUP

(71) Applicant: Zhejiang Sunny Optics Co., Ltd, Yuyao (CN)

(72) Inventors: Jianke Wenren, Yuyao (CN); Fujian Dai, Yuyao (CN); Liefeng Zhao, Yuyao (CN)

(73) Assignee: Zhejiang Sunny Optics Co., Ltd.

( * ) Notice: Subject to any disclaimer, the term of this patent is extended or adjusted under 35 U.S.C. 154(b) by 64 days.

(21) Appl. No.: 17/332,455

(22) Filed: May 27, 2021

(65) Prior Publication Data
US 2022/0003976 A1  Jan. 6, 2022

(30) Foreign Application Priority Data

Jul. 6, 2020  (CN) .......................... 202010638071.X

(51) Int. Cl.
G02B 15/14  (2006.01)

(52) U.S. Cl.
CPC ................................. *G02B 15/144* (2019.08)

(58) Field of Classification Search
CPC ..................................................... G02B 15/144
See application file for complete search history.

*Primary Examiner* — Jack Dinh
(74) *Attorney, Agent, or Firm* — Barnes & Thornburg LLP

(57) ABSTRACT

A zoom lens group, sequentially from an object side to an image side along an optical axis, including a first lens group; a second lens group; a third lens group having positive refractive power; and a fourth lens group having negative refractive power. The zoom lens group continuously zooms by changing positions of the second lens group, the third lens group, and the fourth lens group along the optical axis. A distance TTL from an object-side surface of a lens in the first lens group closest to the object side to an imaging plane of the zoom lens group along the optical axis, and a total effective focal length fw of the zoom lens group in a wide-angle state satisfy: 2.0<TTL/fw<3.0.

14 Claims, 24 Drawing Sheets

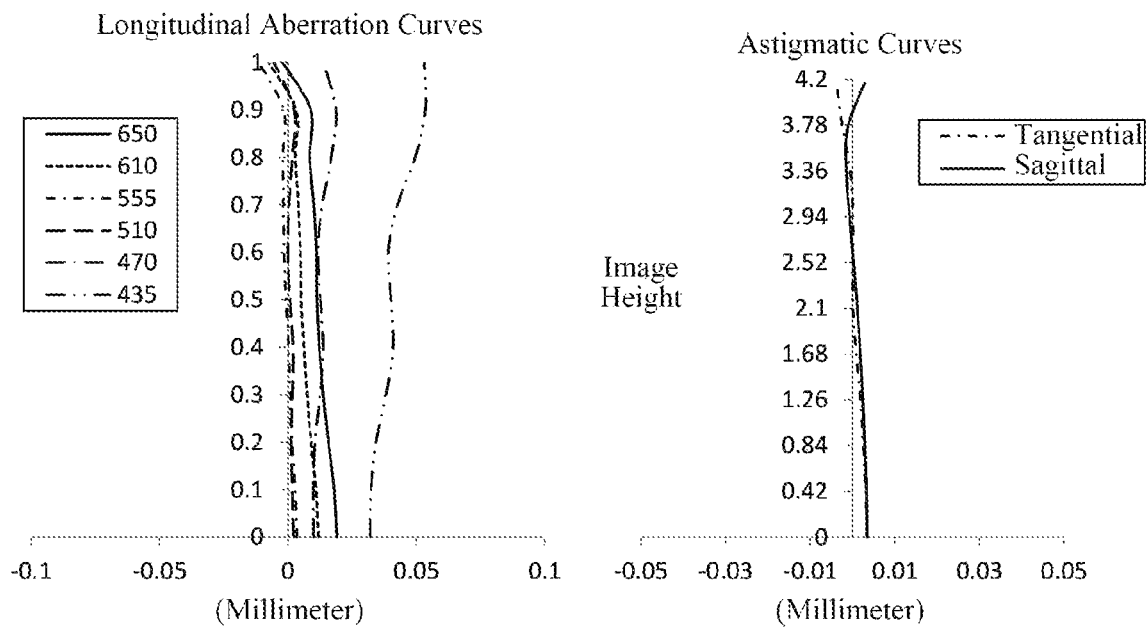
Fig. 10A
Fig. 10B
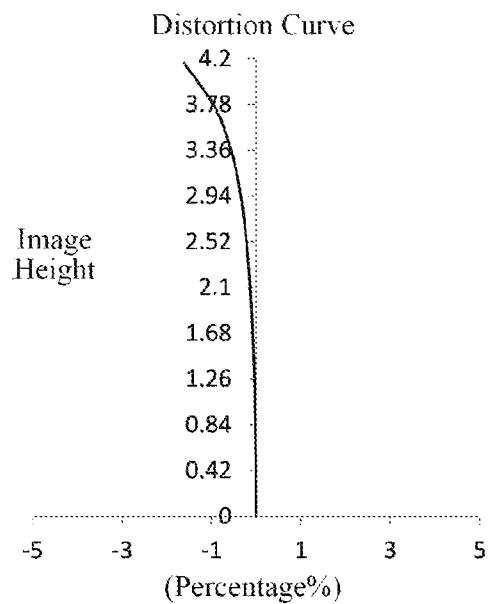
Fig. 10C

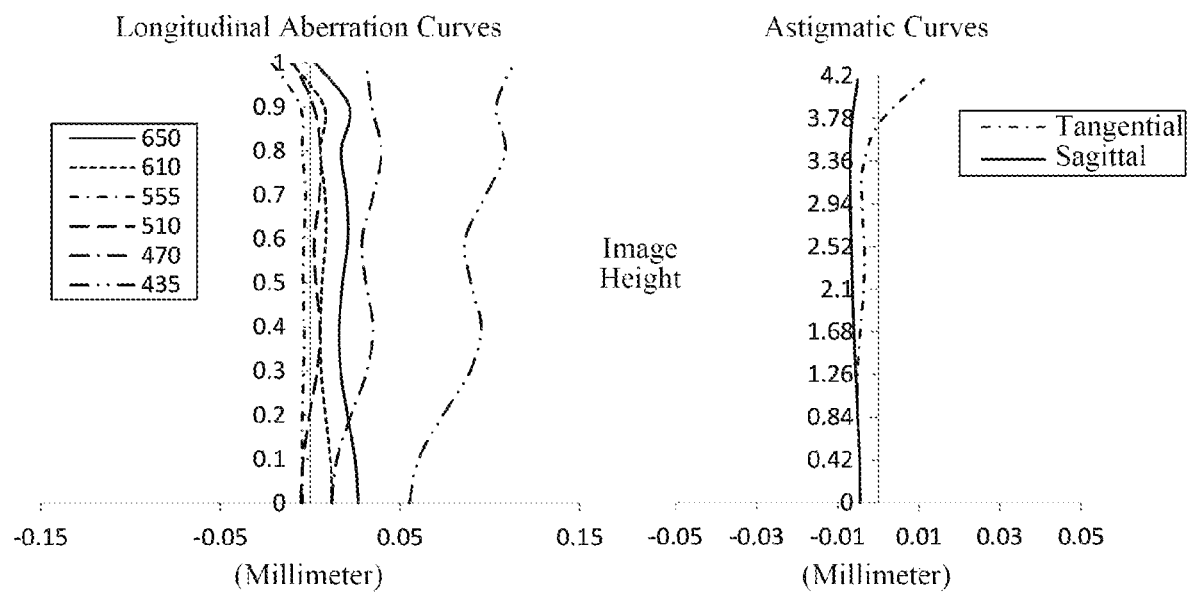
Fig. 18A
Fig. 18B
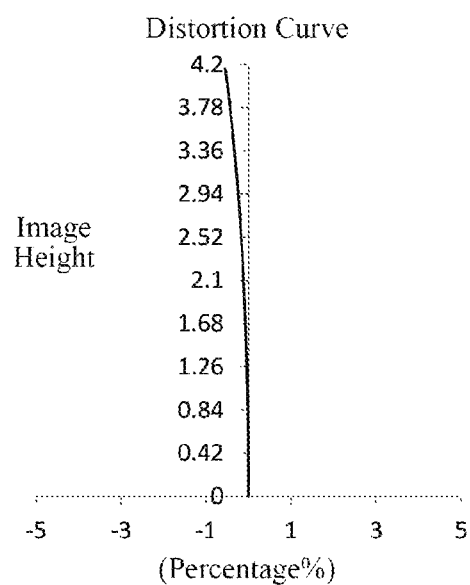
Fig. 18C

ZOOM LENS GROUP

CROSS-REFERENCE TO RELATED APPLICATION

This application claims benefit of priority to Chinese Patent Application No. 202010638071.X filed on Jul. 6, 2020 before the China National Intellectual Property Administration, the entire disclosure of which is incorporated herein by reference in its entity.

TECHNICAL FIELD

The present disclosure relates to the field of optical elements, and more particularly, to a zoom lens group.

BACKGROUND

With the development of camera technology and the advancement of the Internet industry, users have increasingly high requirements on the photographing level and camera quality of mobile devices, such as smartphones and cameras. In the prior art, in order to achieve a zooming effect, a combination scheme including an ultra-clear shot lens assembly, an ultra-wide-angle lens assembly, and a telephoto lens assembly is generally used, and a zooming effect is simulated by switching lens assemblies.

The drawbacks of this multiple lens assemblies zooming scheme are obvious. First, the zooming effect is simulated by the multiple lens assemblies, which involves switching of the multiple lens assemblies, so that the zooming process is not coherent. Second, the switching of the multiple lens assemblies causes the white balance to be unstable, and the visual effect is poor when using the existing zoom lenses. In addition, the principle of digital trimming zoom is utilized in the process of switching the variable focal length from a wide-angle state to a standard state or from a standard state to a telephoto state, so that the zoom performance of the lens is greatly lost.

Therefore, how to combine the miniaturization of the zoom lens with the function of continuous zooming is a problem that needs to be solved urgently in zoom lens at present.

SUMMARY

The present disclosure provides a zoom lens group applicable to portable electronic products that at least solves or partially solves at least one of the above-mentioned disadvantages of the prior art.

One aspect of the present disclosure provides a zoom lens group which may include, sequentially from an object side to an image side along an optical axis, a first lens group; a second lens group; a third lens group having positive refractive power; and a fourth lens group having negative refractive power. The zoom lens group continuously zooms by changing positions of the second lens group, the third lens group, and the fourth lens group along the optical axis. A distance TTL from an object-side surface of a lens in the first lens group closest to the object side to an imaging plane of the zoom lens group along the optical axis, and a total effective focal length fw of the zoom lens group in a wide-angle state may satisfy: $2.0 < TTL/fw < 3.0$.

In one embodiment, the distance TTL from the object-side surface of the lens in the first lens group closest to the object side to the imaging plane of the zoom lens group along the optical axis, and the total effective focal length fw of the zoom lens group in the wide-angle state may satisfy: $2.0 < TTL/fw < 2.5$.

In one embodiment, the distance TTL from the object-side surface of the lens in the first lens group closest to the object side to the imaging plane of the zoom lens group along the optical axis, and a total effective focal length ft of the zoom lens group in a telephoto state may satisfy: $1.0 < TTL/ft < 1.5$.

In one embodiment, the total effective focal length fw of the zoom lens group in the wide-angle state and an effective focal length fG1 of the first lens group may satisfy: $10 \times fw/|fG1| < 0.5$.

In one embodiment, the total effective focal length fw of the zoom lens group in the wide-angle state and an effective focal length fG2 of the second lens group may satisfy: $4.0 < fG2/fw < 4.5$.

In one embodiment, the total effective focal length fw of the zoom lens group in the wide-angle state, a total effective focal length ft of the zoom lens group in a telephoto state, and an effective focal length fG3 of the third lens group may satisfy: $1.4 < fG3/|fw-ft| < 1.6$.

In one embodiment, an effective focal length fG3 of the third lens group and an effective focal length fG4 of the fourth lens group satisfy: $-1.5 < fG3/fG4 \leq -1.0$.

In one embodiment, the first lens group may include a first lens; the second lens group may include a second lens, a third lens, a fourth lens, and a fifth lens; the third lens group may include a sixth lens; and the fourth lens group may include a seventh lens and an eighth lens.

In one embodiment, an effective focal length fG2 of the second lens group and a combined focal length f23 of the second lens and the third lens may satisfy: $2 \leq fG2/f23 < 2.5$.

In one embodiment, an effective focal length fG2 of the second lens group and a combined focal length f45 of the fourth lens and the fifth lens may satisfy: $-1.5 < fG2/f45 < -1.0$.

In one embodiment, a radius of curvature R3 of an object-side surface of the second lens and a radius of curvature R10 of an image-side surface of the fifth lens may satisfy: $-2.0 < R3/R10 \leq -1.0$.

In one embodiment, a radius of curvature R11 of an object-side surface of the sixth lens and a radius of curvature R12 of an image-side surface of the sixth lens may satisfy: $-2.0 < R11/R12 < -1.0$.

In one embodiment, a radius of curvature R15 of an object-side surface of the eighth lens and a radius of curvature R16 of an image-side surface of the eighth lens may satisfy: $-1.5 < R15/R16 < -1.0$.

In one embodiment, the total effective focal length fw of the zoom lens group in the wide-angle state and a total effective focal length ft of the zoom lens group in a telephoto state may satisfy: $1.5 < ft/fw < 2.0$.

Another aspect of the present disclosure provides a zoom lens group which may include, sequentially from an object side to an image side along an optical axis, a first lens group; a second lens group; a third lens group having positive refractive power; and a fourth lens group having negative refractive power. The zoom lens group continuously zooms by changing positions of the second lens group, the third lens group, and the fourth lens group along the optical axis. A distance TTL from an object-side surface of a lens in the first lens group closest to the object side to an imaging plane of the zoom lens group along the optical axis, and a total effective focal length ft of the zoom lens group in a telephoto state may satisfy: $1.0 < TTL/ft < 1.5$.

In one embodiment, the distance TTL from the object-side surface of the lens in the first lens group closest to the object side to the imaging plane of the zoom lens group along the optical axis, and a total effective focal length fw of the zoom lens group in a wide-angle state may satisfy: $2.0<TTL/fw<2.5$.

In one embodiment, a total effective focal length fw of the zoom lens group in a wide-angle state and an effective focal length fG1 of the first lens group may satisfy: $10 \times fw/|fG1|<0.5$.

In one embodiment, a total effective focal length fw of the zoom lens group in a wide-angle state and an effective focal length fG2 of the second lens group may satisfy: $4.0<fG2/fw<4.5$.

In one embodiment, a total effective focal length fw of the zoom lens group in a wide-angle state, the total effective focal length ft of the zoom lens group in the telephoto state, and an effective focal length fG3 of the third lens group may satisfy: $1.4<fG3/|fw-ft|<1.6$.

In one embodiment, an effective focal length fG3 of the third lens group and an effective focal length fG4 of the fourth lens group may satisfy: $-1.5<fG3/fG4 \leq -1.0$.

In one embodiment, the first lens group may include a first lens; the second lens group may include a second lens, a third lens, a fourth lens, and a fifth lens; the third lens group may include a sixth lens; and the fourth lens group may include a seventh lens and an eighth lens.

In one embodiment, an effective focal length fG2 of the second lens group and a combined focal length f23 of the second lens and the third lens may satisfy: $2 \leq fG2/f23<2.5$.

In one embodiment, an effective focal length fG2 of the second lens group and a combined focal length f45 of the fourth lens and the fifth lens may satisfy: $-1.5<f2/f45<-1.0$.

In one embodiment, a radius of curvature R3 of an object-side surface of the second lens and a radius of curvature R10 of an image-side surface of the fifth lens may satisfy: $-2.0<R3/R10 \leq -1.0$.

In one embodiment, a radius of curvature R11 of an object-side surface of the sixth lens and a radius of curvature R12 of an image-side surface of the sixth lens may satisfy: $-2.0<R11/R12<-1.0$.

In one embodiment, a radius of curvature R15 of an object-side surface of the eighth lens and a radius of curvature R16 of an image-side surface of the eighth lens may satisfy: $-1.5<R15/R16<-1.0$.

In one embodiment, a total effective focal length fw of the zoom lens group in a wide-angle state and the total effective focal length ft of the zoom lens group in the telephoto state may satisfy: $1.5<ft/fw<2.0$.

The present disclosure provides a zoom lens group having continuous zoom, miniaturization, and good imaging quality by reasonably allocating refractive power and optimizing optical parameters.

BRIEF DESCRIPTION OF THE DRAWINGS

Other features, objects, and advantages of the present disclosure will become more apparent by reading the detailed description of the non-limiting embodiments with reference to the accompanying drawings:

FIGS. 10A to 10C show longitudinal aberration curves, astigmatic curves and a distortion curve, respectively, when the zoom lens group of Example 2 is in a wide-angle state;

FIGS. 18A to 18C show longitudinal aberration curves, astigmatic curves, and a distortion curve, respectively, when the zoom lens group of Example 3 is in a telephoto state;

DETAILED DESCRIPTION OF EMBODIMENTS

Figure 1:
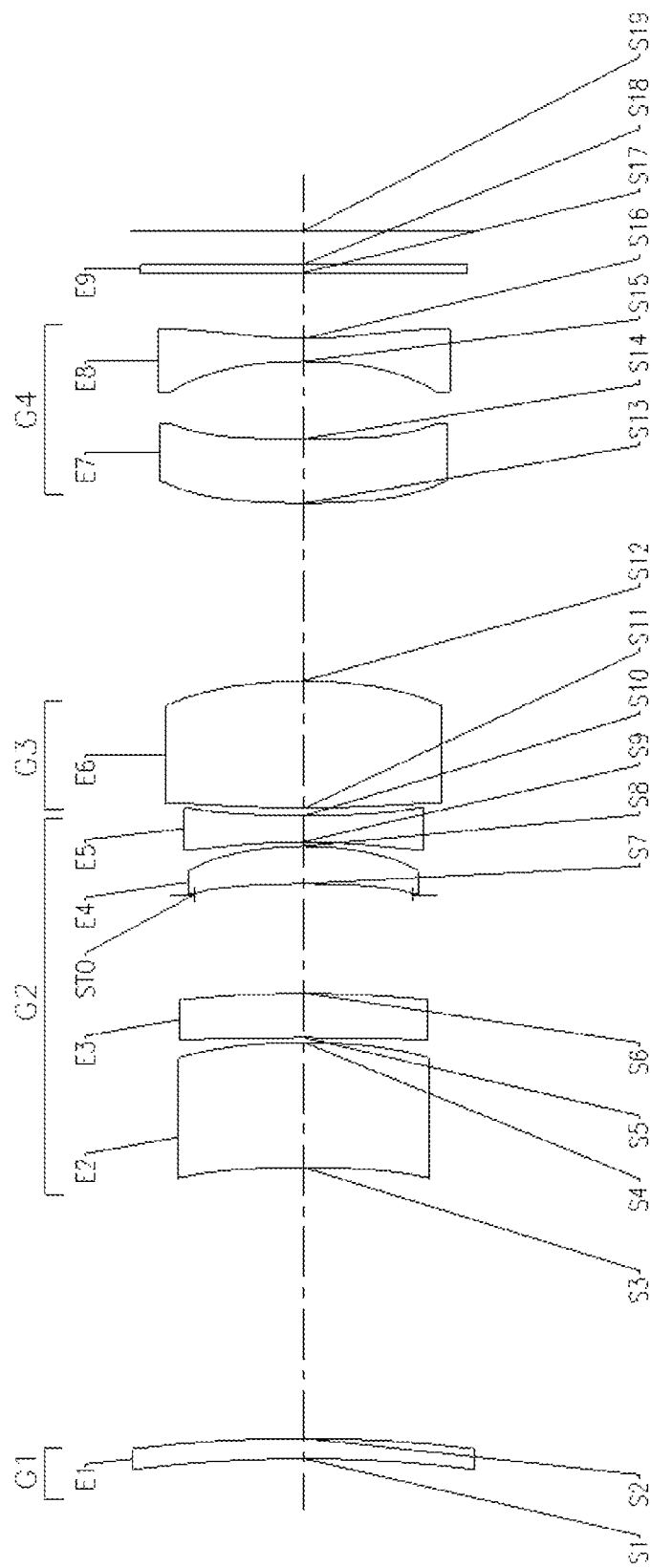
FIG. 1 shows a schematic structural view of a zoom lens group in a wide-angle state according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A zoom lens group according to an exemplary embodiment of the present disclosure may include eight lenses having refractive power. The zoom lens group may include a first lens group including a first lens; a second lens group including a second lens, a third lens, a fourth lens, and a fifth lens; a third lens group including a sixth lens; and a fourth lens group including a seventh lens and an eighth lens. The eight lenses are arranged sequentially along an optical axis from an object side to an image side.

In an exemplary embodiment, the third lens may have positive refractive power and the fourth lens may have negative refractive power, which facilitates correction of the spherical aberration of the zoom lens group and improves the imaging quality of the zoom lens group.

In the exemplary embodiment, by changing the positions of the second lens group, the third lens group, and the fourth lens group along the optical axis, switching of the zoom lens group from a wide-angle state to a telephoto state can be realized. The refractive power of the lens group is rationally distributed. When the lens group is in the wide-angle state, the distance between the zoom groups formed by the first lens group and the second lens group is maximized, and the distance between the compensation groups formed by the third lens group and the fourth lens group is minimized to achieve a minimum focal length and maximum field-of-view. As the lens group zooms toward the telephoto state, the distance between the zooming groups formed by the first lens group and the second lens group is shortened, the distance between the compensation groups formed by the third lens group and the fourth lens group is lengthened, the ratio of a total focal length in the telephoto state to a total focal length in the wide angle state is continuously changed, and the continuous zooming process of the zoom lens group is achieved.

In the exemplary embodiment, a distance TTL from an object-side surface of the lens in the first lens group closest to the object side to an imaging plane of the zoom lens group along the optical axis and a total effective focal length fw of the zoom lens group in the wide-angle state may satisfy: $2.0 < TTL/fw < 3.0$. For example, $2.0 < TTL/fw < 2.5$. By controlling the ratio of the distance from the object-side surface of the lens in the first lens group closest to the object side to the imaging plane of the zoom lens group along the optical axis to the total effective focal length of the zoom lens group in the wide-angle state within a reasonable numerical range, the zoom lens group has a small amount of movement while satisfying a large zoom range when the zoom lens group is in the wide-angle state, thereby facilitating reduction of the overall size of the optical lens group and facilitating design of a motor for driving the zoom lens group.

In the exemplary embodiment, a distance TTL from an object-side surface of the lens in the first lens group closest to the object side to an imaging plane of the zoom lens group along the optical axis and a total effective focal length ft of the zoom lens group in the telephoto state may satisfy: $1.0<TTL/ft<1.5$. By controlling the ratio of the distance from the object-side surface of the lens in the first lens group closest to the object side to the imaging plane of the zoom lens group along the optical axis to the total effective focal length of the zoom lens group in the telephoto state within a reasonable numerical range, it is beneficial to control the total length of the zoom lens group in the telephoto state so as to effectively reduce the size of the zoom lens group, and also to enable the lens group to have a small amount of movement when the zoom lens group is in the zoom to the telephoto state.

In an exemplary embodiment, a total effective focal length fw of the zoom lens group in the wide-angle state and an effective focal length fG1 of the first lens group may satisfy: $10\times fw/|fG1|<0.5$. By controlling the ratio of the total effective focal length of the zoom lens group in the wide-angle state to the effective focal length of the first lens group within a reasonable numerical range, it is beneficial to reduce the refractive power of the first lens group. Because the first lens group needs to remain unchanged during the zooming process, reducing the refractive power of the first lens group facilitates the refractive power distribution of the subsequent lens group and increases the zoom range of the lens group.

In an exemplary embodiment, a total effective focal length fw of the zoom lens group in the wide-angle state and an effective focal length fG2 of the second lens group may satisfy: $4.0<fG2/fw<4.5$. Reasonable control of the relationship between the total effective focal length of the zoom lens group in the wide-angle state and the effective focal length of the second lens group contributes to increasing the refractive power of the second lens group, so that the zoom lens group may obtain a relatively large zoom range.

In the exemplary embodiment, a total effective focal length fw of the zoom lens group in the wide-angle state, a total effective focal length ft of the zoom lens group in the telephoto state, and an effective focal length fG3 of the third lens group may satisfy: $1.4<fG3/|fw-ft|<1.6$. Reasonable control of the relationship between the total effective focal length of the zoom lens group in the wide-angle state, the total effective focal length of the zoom lens group in the telephoto state, and the effective focal length of the third lens group helps control the refractive power of the third lens group. The distribution of the refractive power is balanced by controlling the refractive power of the third lens group, which improves the imaging quality of the zoom lens group.

In an exemplary embodiment, an effective focal length fG3 of the third lens group and an effective focal length fG4 of the fourth lens group may satisfy: $-1.5<fG3/fG4\leq-1.0$. For example, $-1.2<fG3/fG4\leq-1.0$. By reasonably controlling the refractive power of the third lens group and the fourth lens group to balance the distribution of the refractive power of each component, it is beneficial to better exert the performance of the optical lens group.

In an exemplary embodiment, an effective focal length fG2 of the second lens group and a combined focal length f23 of the second lens and the third lens may satisfy: $2\leq fG2/f23<2.5$. By reasonably controlling the refractive power of the second lens and the third lens in the second lens group, it is beneficial to compensate aberration and improve the imaging quality of the zoom lens group.

In an exemplary embodiment, an effective focal length fG2 of the second lens group and a combined focal length f45 of the fourth lens and the fifth lens may satisfy: $-1.5<fG2/f45<-1.0$. By reasonably controlling the refractive power of the fourth lens and the fifth lens in the second lens group, the refractive power of the lenses in the second lens group can be effectively balanced.

In an exemplary embodiment, a radius of curvature R3 of an object-side surface of the second lens and a radius of curvature R10 of an image-side surface of the fifth lens may satisfy: $-2.0<R3/R10\leq-1.0$. By controlling the ratio between the radius of curvature of the object-side surface of the second lens and the radius of curvature of the image-side surface of the fifth lens within a reasonable numerical range, the distribution of the refractive power of the second lens and the fifth lens is facilitated, and the imaging quality of the zoom lens group is improved.

In an exemplary embodiment, a radius of curvature R11 of an object-side surface of the sixth lens and a radius of curvature R12 of an image-side surface of the sixth lens may satisfy: $-2.0<R11/R12<-1.0$. For example, $-2.0<R11/R12<-1.5$. By controlling the ratio between the radii of curvature of the object-side surface and the image-side surface of the sixth lens within a reasonable numerical range, the distribution of the refractive power of the sixth lens can be controlled, and at the same time, the third lens group including the sixth lens can be used as a compensation group in the zoom system to perform compensation in zoom process.

In an exemplary embodiment, a radius of curvature R15 of an object-side surface of the eighth lens and a radius of curvature R16 of an image-side surface of the eighth lens may satisfy: $-1.5<R15/R16<-1.0$. By controlling the ratio between the radii of curvature of the object-side surface and the image-side surface of the eighth lens within a reasonable numerical range, the distribution of refractive power of the eighth lens is controlled to compensate the magnification chromatic aberration and field curvature of the zoom lens group, thereby improving the imaging quality of the zoom system.

In an exemplary embodiment, a total effective focal length fw of the zoom lens group in the wide-angle state and a total effective focal length ft of the zoom lens group in the telephoto state may satisfy: $1.5<ft/fw<2.0$. By controlling the ratio between the total effective focal length of the zoom lens group in the wide-angle state and the total effective focal length of the zoom lens group in the telephoto state within a reasonable value range, it is beneficial to improve the zoom capability of the zoom lens group. The larger the value of the ratio is, the stronger the zoom capability of the system will be.

In an exemplary embodiment, the zoom lens group described above may also include a stop. The stop may be positioned in place as desired. For example, the stop may be disposed between the third lens and the fourth lens in the second lens group. Arranging the stop between the third lens and the fourth lens advantageously reduces the size of the zoom lens. At the same time, the stop is located in the middle of the optical lens group, so that the optical lens group has a front-to-back symmetrical structure, thereby facilitating the compensation of aberrations.

The present disclosure provides a zoom lens group having characteristics of continuous zooming, high integration, miniaturization, high imaging quality, and the like. The zoom lens group according to the above embodiments of the present disclosure may employ includes a plurality of lenses, such as eight lenses as described above. By reasonably allocating the refractive power of each lens, the surface type, the radius of curvature of each lens, and the like, the incident light can be effectively converged, the total optical length of the lens group can be reduced, and the processability of the lens group can be improved, so that the zoom lens group is more applicable for production and processing.

In an exemplary embodiment, at least one of the surfaces of lenses is aspheric, that is, at least one of the object-side surface of the first lens to the image-side surface of the eight lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, the seventh lens, and the eighth lens is aspheric. Optionally, the object-side surface and the image-side surface of each of the first lens, the second lens, the third lens, the fourth lens, the fifth lens, the sixth lens, the seventh lens, and the eighth lens are aspheric.

However, it will be appreciated by those skilled in the art that the number of lenses constituting the zoom lens group may be varied to obtain the various results and advantages described in this specification without departing from the technical solution claimed by the present disclosure. For example, although an embodiment is described by taking eight lenses as an example, the zoom lens group is not limited to include eight lenses. If desired, the zoom lens group may also include other numbers of lenses.

Some specific examples of a zoom lens group applicable to the above embodiment will be further described below with reference to the accompanying drawings.

Example 1

Figure 2:
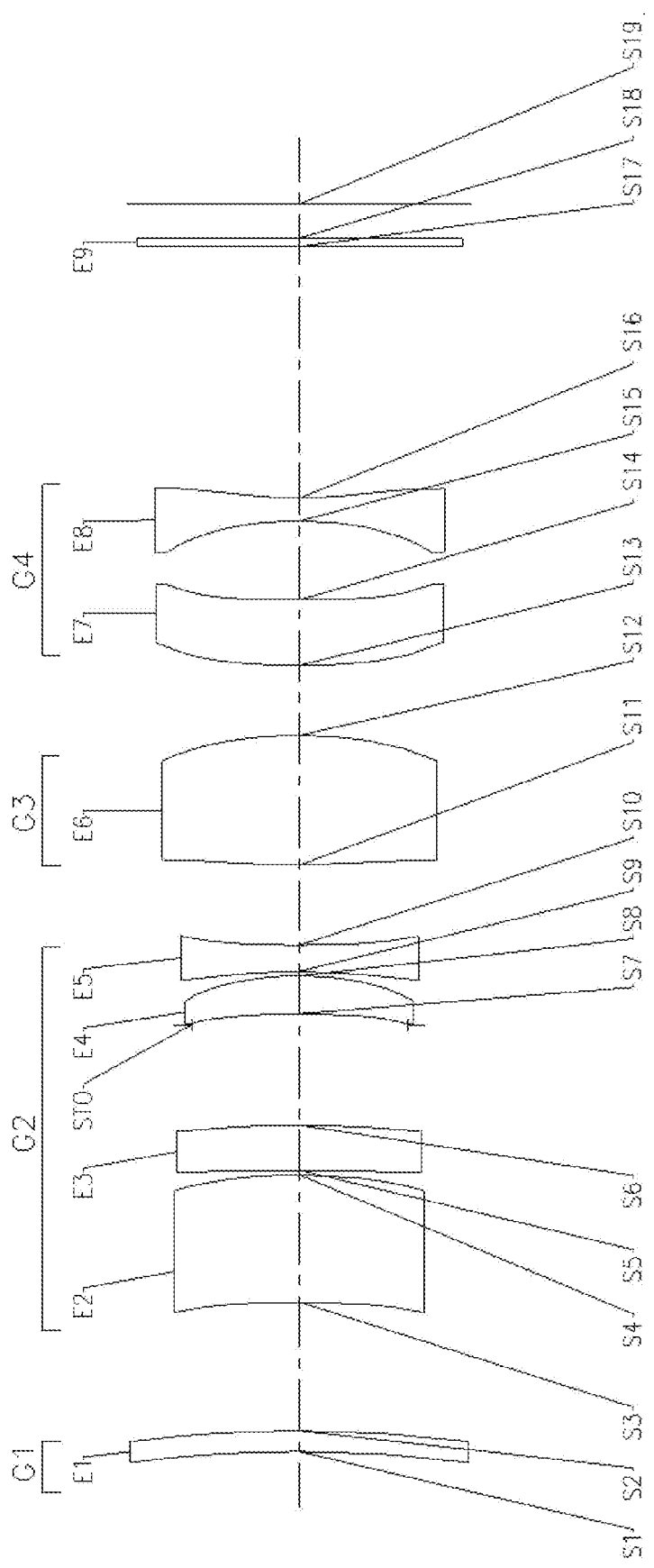
FIG. 2 shows a schematic structural view of a zoom lens group in an intermediate state during a transition from a wide-angle state to a telephoto state according to Example 1 of the present disclosure.
Figure 3:
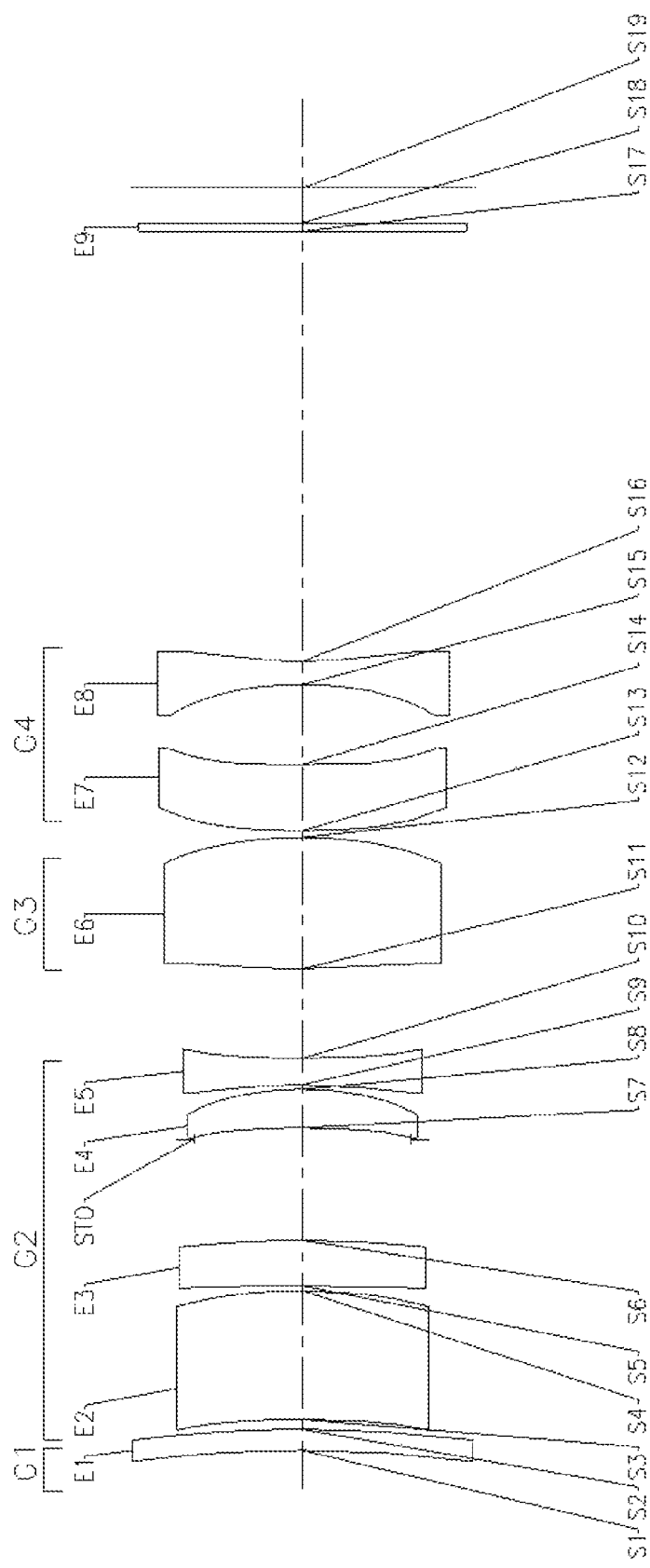
FIG. 3 shows a schematic structural view of a zoom lens group in a telephoto state according to Example 1 of the present disclosure.

A zoom lens group according to Example 1 of the present disclosure is described below with reference to FIGS. 1 to 6C. FIG. 1 shows a schematic structure view of a zoom lens group in a wide-angle state according to Example 1 of the present disclosure. FIG. 2 shows a schematic structural view of a zoom lens group in an intermediate state during a transition from a wide-angle state to a telephoto state according to Example 1 of the present disclosure. FIG. 3 shows a schematic structural view of a zoom lens group in a telephoto state according to Example 1 of the present disclosure.

As shown in FIGS. 1 to 3, the zoom lens group sequentially includes a first lens group G1 (a first lens E1), a second lens group G2 (a second lens E2, a third lens E3, a fourth lens E4, and a fifth lens E5), a third lens group G3 (a sixth lens E6), a fourth lens group G4 (a seventh lens E7, and an eighth lens E8), an optical filter E9, and an imaging plane S19, from an object side to an imaging side along an optical axis. The zoom lens group further includes a stop STO disposed between the third lens E3 and the fourth lens E4 of the second lens group G2.

An object-side surface S1 of the first lens E1 is a concave surface, and an image-side surface S2 thereof is a convex surface. An object-side surface S3 of the second lens E2 is a concave surface, and an image-side surface S4 thereof is a convex surface. An object-side surface S5 of the third lens E3 is a concave surface, and an image-side surface S6 thereof is a convex surface. An object-side surface S7 of the fourth lens E4 is a concave surface, and an image-side surface S8 thereof is a convex surface. An object-side surface S9 of the fifth lens E5 is a concave surface, and an image-side surface S10 thereof is a concave surface. An object-side surface S11 of the sixth lens E6 is a convex surface, and an image-side surface S12 is a convex surface. An object-side surface S13 of the seventh lens E7 is a convex surface, and an image-side surface S14 is a concave surface. An object-side surface S15 of the eighth lens E8 is a concave surface, and an image-side surface S16 is a concave surface. The optical filter E9 has an object-side surface S17 and an image-side surface S18. Light from an object sequentially passes through the respective surfaces S1 to S18 and is finally imaged on the imaging plane S19.

Table 1 is a table showing the basic parameters of the zoom lens group of Example 1, wherein the radius of curvature, the thickness, and the focal length are all in units of millimeters (mm).

TABLE 1

| Surface number | Surface type | Radius of curvature | Thickness/ Distance | Refractive index | Abbe number | Conic coefficient |
|---|---|---|---|---|---|---|
| OBJ | Spherical | Infinite | Infinite | | | |
| S1 | Spherical | −31.9644 | 0.5000 | 1.546 | 56.13 | 0.000 |
| S2 | Spherical | −32.0984 | T1 | | | 0.000 |
| S3 | Aspheric | −27.5250 | 3.0548 | 1.546 | 56.13 | 10.901 |
| S4 | Aspheric | −13.7509 | 0.1146 | | | 0.189 |
| S5 | Aspheric | −83.9965 | 1.0814 | 1.677 | 19.24 | −40.481 |
| S6 | Aspheric | −30.5016 | 2.4069 | | | 6.042 |
| STO | Spherical | Infinite | 0.2677 | | | |
| S7 | Aspheric | −17.6199 | 0.9133 | 1.546 | 56.13 | −9.845 |
| S8 | Aspheric | −7.6160 | 0.1000 | | | 0.476 |
| S9 | Aspheric | −19.3787 | 0.6372 | 1.677 | 19.24 | −22.963 |
| S10 | Aspheric | 25.3716 | T2 | | | 43.866 |
| S11 | Aspheric | 20.7390 | 3.1160 | 1.546 | 56.13 | 23.039 |
| S12 | Aspheric | −11.3134 | T3 | | | 4.655 |
| S13 | Aspheric | 22.5494 | 1.5695 | 1.677 | 19.24 | 4.064 |
| S14 | Aspheric | 69.2388 | 1.8969 | | | 45.076 |
| S15 | Aspheric | −11.3520 | 0.5502 | 1.537 | 55.71 | −53.440 |
| S16 | Aspheric | 8.9369 | T4 | | | −4.163 |
| S17 | Spherical | Infinite | 0.2100 | 1.518 | 64.17 | |
| S18 | Spherical | Infinite | 0.8187 | | | |
| S19 | Spherical | Infinite | | | | |

In this example, by changing the separation distance T1 between the first lens group and the second lens group along the optical axis (i.e., a separation distance between the image-side surface S2 of the first lens E1 and the object-side surface S3 of the second lens E2 along the optical axis), the separation distance T2 between the second lens group and the third lens group along the optical axis (i.e., a separation distance between the image-side surface S10 of the fifth lens E5 and the object-side surface S11 of the sixth lens E6 along the optical axis), the separation distance T3 between the third lens group and the fourth lens group along the optical axis (i.e., a separation distance between the image-side surface S12 of the sixth lens E6 and the object-side surface S13 of the seventh lens E7 along the optical axis), and the separation distance T4 between the fourth lens group and the optical filter along the optical axis (i.e., a separation distance between the image-side surface S16 of the eighth lens E8 and the object-side surface S17 of the optical filter E9 along the optical axis), the zoom lens group is switched from a wide-angle state to a telephoto state or from a telephoto state to a wide-angle state. A total effective focal length f, an aperture value Fno, and a maximum field-of-view FOV of the zoom lens group vary as the zoom lens group switches from the wide-angle state to the telephoto state or from the telephoto state to the wide-angle state. In the zoom lens group, a distance TTL from the object-side surface S1 of the first lens E1 to the imaging plane S19 of the zoom lens group along the optical axis remains unchanged in the wide-angle state, the telephoto state, and the intermediate state.

Table 2 shows a parameter table corresponding to the different states of the zoom lens group of Example 1, wherein units of f, T1, T2, T3 and T4 are all millimeters (mm) and unit of FOV is degrees (°).

TABLE 2

| Parameters | Wide-angle state | Intermediate state | Telephoto state |
|---|---|---|---|
| f | 14.18 | 19.07 | 23.37 |
| FOV | 33.3 | 24.8 | 20.3 |
| Fno | 2.65 | 3.55 | 4.31 |
| T1 | 6.6084 | 3.0901 | 0.2346 |
| T2 | 0.1795 | 1.9193 | 2.1255 |
| T3 | 4.3341 | 1.6820 | 0.1632 |
| T4 | 1.6109 | 6.0415 | 10.2096 |

In Example 1, the object-side surface and the image-side surface of any one of the second lens E2 to the eighth lens E8 are aspherical surfaces, and surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S3 to S16 in Example 1.

TABLE 3

| Surface number | A4 | A6 | A8 | A10 | A12 |
|---|---|---|---|---|---|
| S3 | −1.7730E−01 | −1.2810E−02 | −3.0411E−03 | −1.6062E−03 | −7.6652E−04 |
| S4 | −1.0236E−01 | −1.9121E−02 | −9.7992E−04 | −2.4754E−03 | 1.0743E−03 |
| S5 | −5.4561E−03 | 6.9310E−03 | 2.6635E−03 | −1.1624E−03 | 1.0360E−04 |
| S6 | −1.7106E−02 | 7.6924E−03 | 1.1163E−03 | 1.7500E−04 | −2.4548E−07 |
| S7 | −2.2760E−02 | −2.2384E−02 | −1.6979E−05 | 3.8560E−04 | −2.1134E−05 |
| S8 | −5.6196E−02 | −2.5164E−02 | −1.0053E−03 | 1.9027E−03 | −9.7290E−04 |
| S9 | −4.3497E−02 | 1.6563E−02 | −1.6667E−02 | 8.8725E−03 | −2.6939E−03 |
| S10 | 1.6944E−02 | −1.1065E−02 | −1.1559E−02 | 1.0165E−02 | 1.0109E−04 |
| S11 | −1.4161E−01 | −6.9185E−03 | 4.7075E−05 | 4.6660E−05 | −3.9283E−06 |
| S12 | −1.4539E−01 | 4.7500E−02 | 8.4757E−04 | −2.3602E−03 | 2.4714E−03 |
| S13 | 3.5792E−01 | −1.5761E−03 | −6.7428E−03 | −2.2878E−03 | −2.7432E−03 |
| S14 | 3.2565E−01 | 7.7278E−04 | −7.4033E−03 | −3.5931E−03 | −6.6727E−04 |
| S15 | −5.7225E−01 | 3.9346E−02 | −3.0195E−02 | −2.5419E−03 | −1.7815E−03 |
| S16 | −6.5552E−01 | 4.2170E−02 | −2.5201E−02 | 1.1538E−02 | 1.2694E−03 |

| Surface number | A14 | A16 | A18 | A20 |
|---|---|---|---|---|
| S3 | −3.6893E−04 | −1.8113E−04 | −8.3795E−05 | −2.3279E−05 |
| S4 | 8.7490E−05 | 2.6029E−04 | −2.3226E−04 | 1.2746E−04 |
| S5 | −2.4004E−04 | 2.4109E−04 | −7.9855E−05 | 3.7004E−06 |
| S6 | −5.5793E−05 | 2.3685E−05 | 6.9222E−07 | −8.0767E−07 |
| S7 | −2.3535E−05 | 5.7651E−06 | 3.5592E−06 | −1.4051E−06 |
| S8 | 2.5598E−04 | −5.0191E−05 | −9.6234E−06 | −1.1391E−05 |
| S9 | −4.2533E−04 | −1.1853E−03 | 4.0980E−04 | −1.2582E−05 |
| S10 | −4.8892E−04 | −3.6332E−04 | 0.0000E+00 | 0.0000E+00 |
| S11 | −1.9723E−05 | −1.5257E−07 | 0.0000E+00 | 0.0000E+00 |
| S12 | 2.0829E−03 | 5.2674E−04 | 0.0000E+00 | 0.0000E+00 |
| S13 | −5.4329E−05 | −3.4210E−05 | 0.0000E+00 | 0.0000E+00 |
| S14 | −3.9827E−05 | 1.2863E−06 | 0.0000E+00 | 0.0000E+00 |
| S15 | −1.0606E−04 | −9.5209E−05 | 0.0000E+00 | 0.0000E+00 |
| S16 | 7.4768E−04 | −8.5124E−05 | 0.0000E+00 | 0.0000E+00 |

Figure 4A:
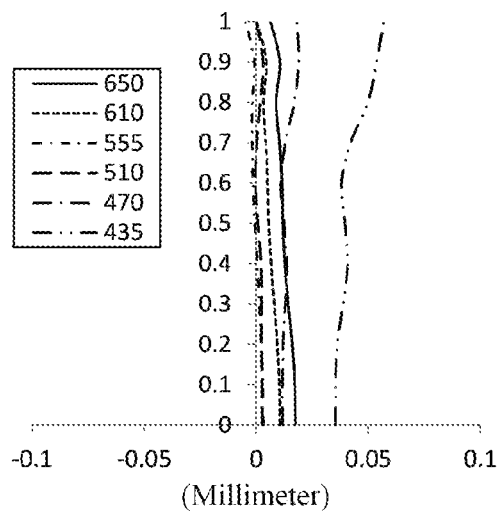
FIGS. 4A to 4C show longitudinal aberration curves, astigmatic curves and a distortion curve, respectively, when the zoom lens group of Example 1 is in a wide-angle state.
Figure 4B:
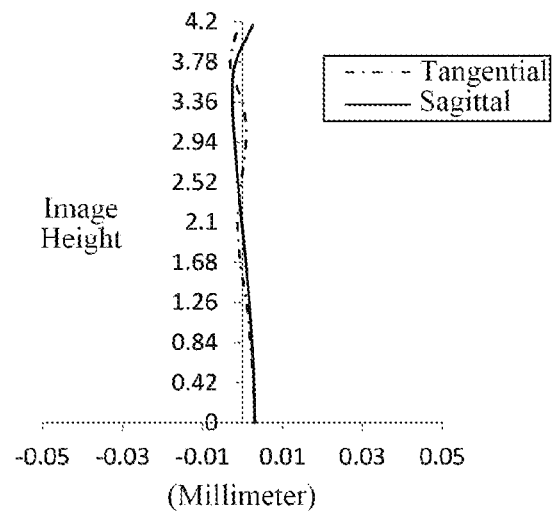
Figure 4C:
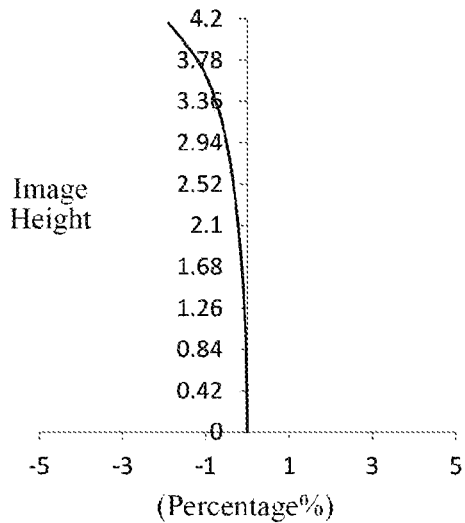
Figure 5A:
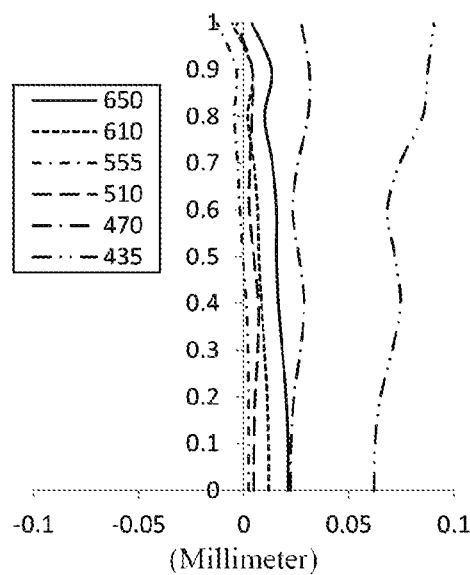
FIGS. 5A to 5C show longitudinal aberration curves, astigmatic curves, and a distortion curve, respectively, when the zoom lens group of Example 1 is in an intermediate state during a transition from a wide-angle state to a telephoto state.
Figure 5B:
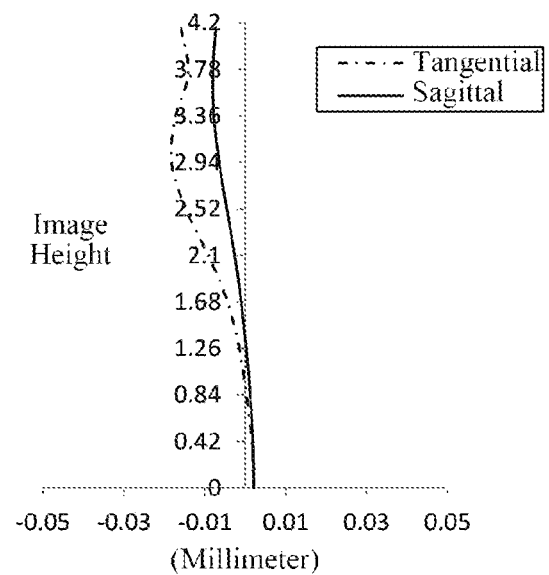
Figure 5C:
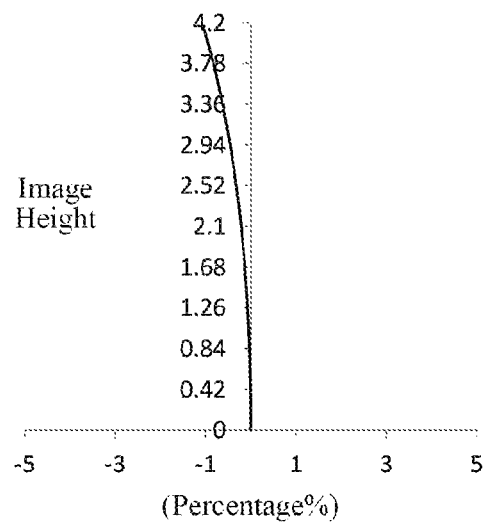
Figure 6A:
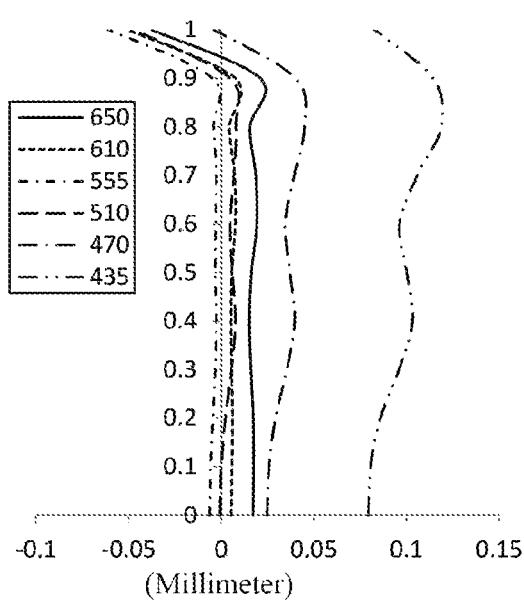
FIGS. 6A to 6C show longitudinal aberration curves, astigmatic curves, and a distortion curve, respectively, when the zoom lens group of Example 1 is in a telephoto state.
Figure 6B:
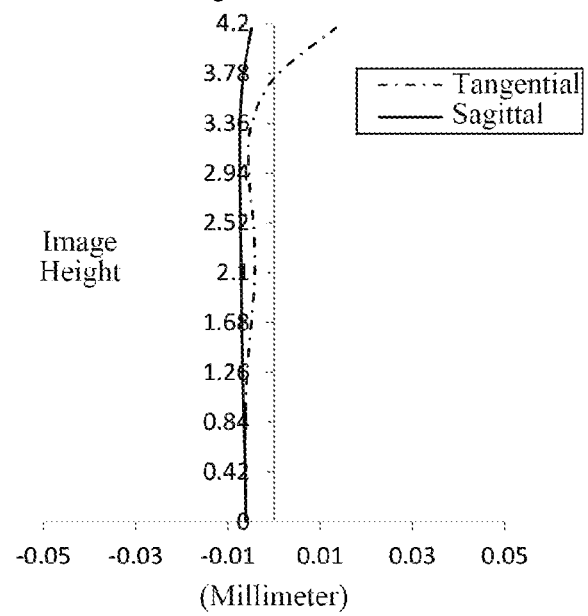
Figure 6C:
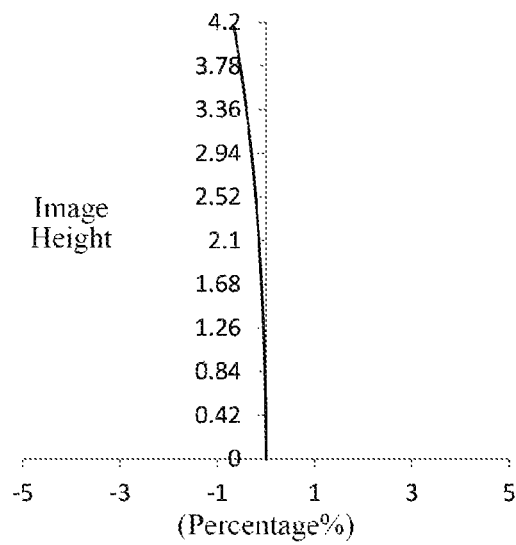

FIGS. 4A, 5A, and 6A show longitudinal aberration curves when the zoom lens group of Example 1 is in the wide-angle state, the intermediate state, and the telephoto state, respectively, representing the deviations of focal points converged by light of different wavelengths after passing through the lens assembly. FIGS. 4B, 5B, and 6B show astigmatic curves when the zoom lens group of Example 1 is in the wide-angle state, the intermediate state, and the telephoto state, respectively, representing the curvatures of a tangential plane and the curvatures of a sagittal plane. FIGS. 4C, 5C, and 6C show a distortion curve when the zoom lens group of Example 1 is in the wide-angle state, the intermediate state, and the telephoto state, respectively, representing the amounts of distortion corresponding to different image heights. As can be seen from FIGS. 4A to 6C, the zoom lens group according to Example 1 can achieve good imaging quality in each state.

Example 2

A zoom lens group according to Example 2 of the present disclosure is described below with reference to FIGS. 7 to 12C. In the present example and the following examples, a description similar to Example 1 will be omitted for brevity.

An object-side surface S1 of the first lens E1 is a concave surface, and image-side surface S2 thereof is a convex surface. An object-side surface S3 of the second lens E2 is a concave surface, and an image-side surface S4 thereof is a convex surface. An object-side surface S5 of the third lens E3 is a convex surface, and an image-side surface S6 thereof is a convex surface. An object-side surface S7 of the fourth lens E4 is a concave surface, and an image-side surface S8 thereof is a convex surface. An object-side surface S9 of the fifth lens E5 is a concave surface, and an image-side surface S10 thereof is a concave surface. An object-side surface S11 of the sixth lens E6 is a convex surface, and an image-side surface S12 thereof is a convex surface. An object-side surface S13 of the seventh lens E7 is a convex surface, and an image-side surface S14 is a concave surface. An object-side surface S15 of the eighth lens E8 is a concave surface, and an image-side surface S16 is a concave surface. The optical filter E9 has an object-side surface S17 and an image-side surface S18. Light from an object sequentially passes through the respective surfaces S1 to S18 and is finally imaged on the imaging plane S19.

Table 4 is a table showing the basic parameters of the zoom lens group of Example 2, wherein the radius of curvature, the thickness, and the focal length are all in units of millimeters (mm).

TABLE 4

| Surface number | Surface type | Radius of curvature | Thickness/ Distance | Material Refractive index | Abbe number | Conic coefficient |
|---|---|---|---|---|---|---|
| OBJ | Spherical | Infinite | Infinite | | | |
| S1 | Spherical | −19.6937 | 0.8000 | 1.546 | 56.13 | 0.0000 |
| S2 | Spherical | −19.8624 | T1 | | | 0.0000 |
| S3 | Aspheric | −31.2065 | 2.9560 | 1.546 | 56.13 | 8.9679 |
| S4 | Aspheric | −14.6694 | 0.1000 | | | 0.1239 |
| S5 | Aspheric | 66.5749 | 0.9807 | 1.677 | 19.24 | 88.1063 |
| S6 | Aspheric | −174.3121 | 2.3143 | | | −99.0000 |
| STO | Spherical | Infinite | 0.3117 | | | |
| S7 | Aspheric | −17.9814 | 0.9051 | 1.546 | 56.13 | −10.4622 |
| S8 | Aspheric | −7.6383 | 0.1000 | | | 0.4635 |
| S9 | Aspheric | −19.1631 | 0.5106 | 1.677 | 19.24 | −22.4414 |
| S10 | Aspheric | 25.2861 | T2 | | | 42.6010 |
| S11 | Aspheric | 18.6163 | 3.0269 | 1.546 | 56.13 | 22.3802 |
| S12 | Aspheric | −11.9209 | T3 | | | 4.6627 |
| S13 | Aspheric | 24.8765 | 1.5711 | 1.677 | 19.24 | 6.7853 |
| S14 | Aspheric | 128.9554 | 1.8812 | | | −15.0646 |
| S15 | Aspheric | −10.6478 | 0.6030 | 1.537 | 55.71 | −45.1288 |
| S16 | Aspheric | 9.0536 | T4 | | | −4.8011 |
| S17 | Spherical | Infinite | 0.2100 | 1.518 | 64.17 | |
| S18 | Spherical | Infinite | 0.7938 | | | |
| S19 | Spherical | Infinite | | | | |

Figure 7:
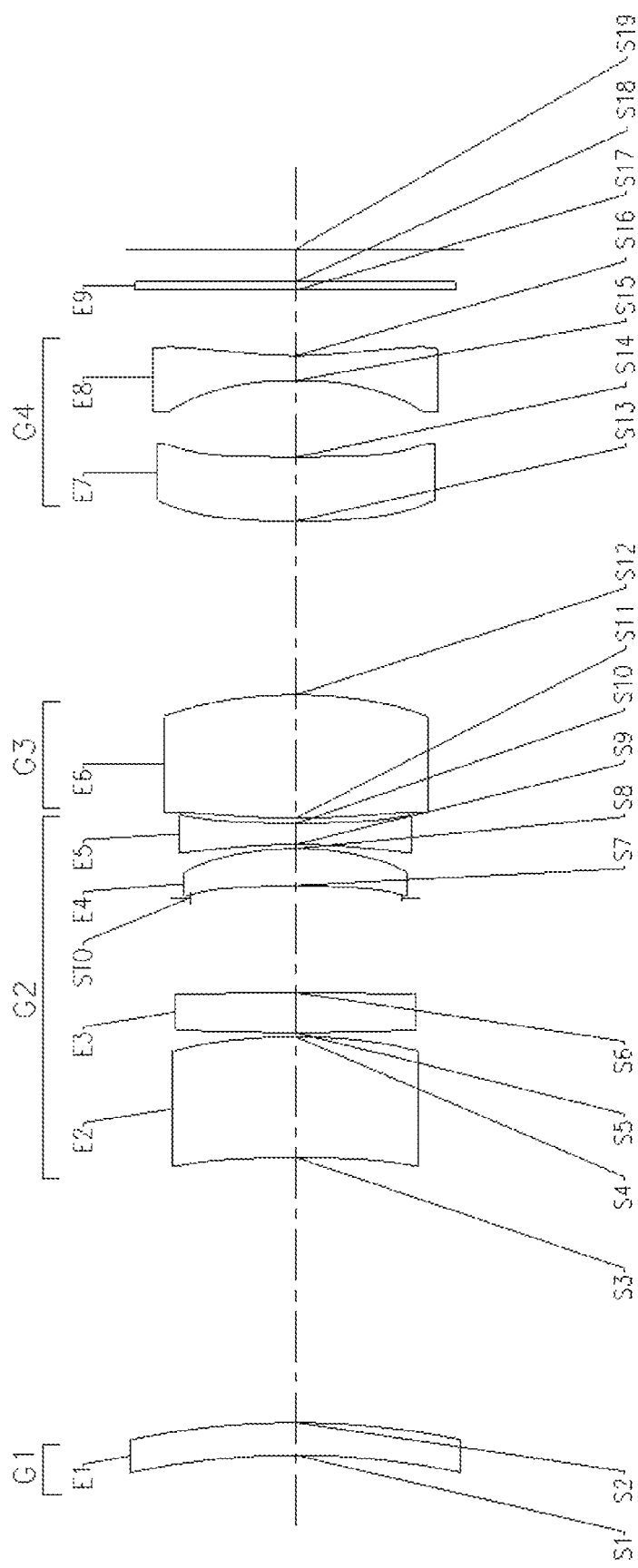
FIG. 7 shows a schematic structural view of a zoom lens group in a wide-angle state according to Example 2 of the present disclosure.
Figure 8:
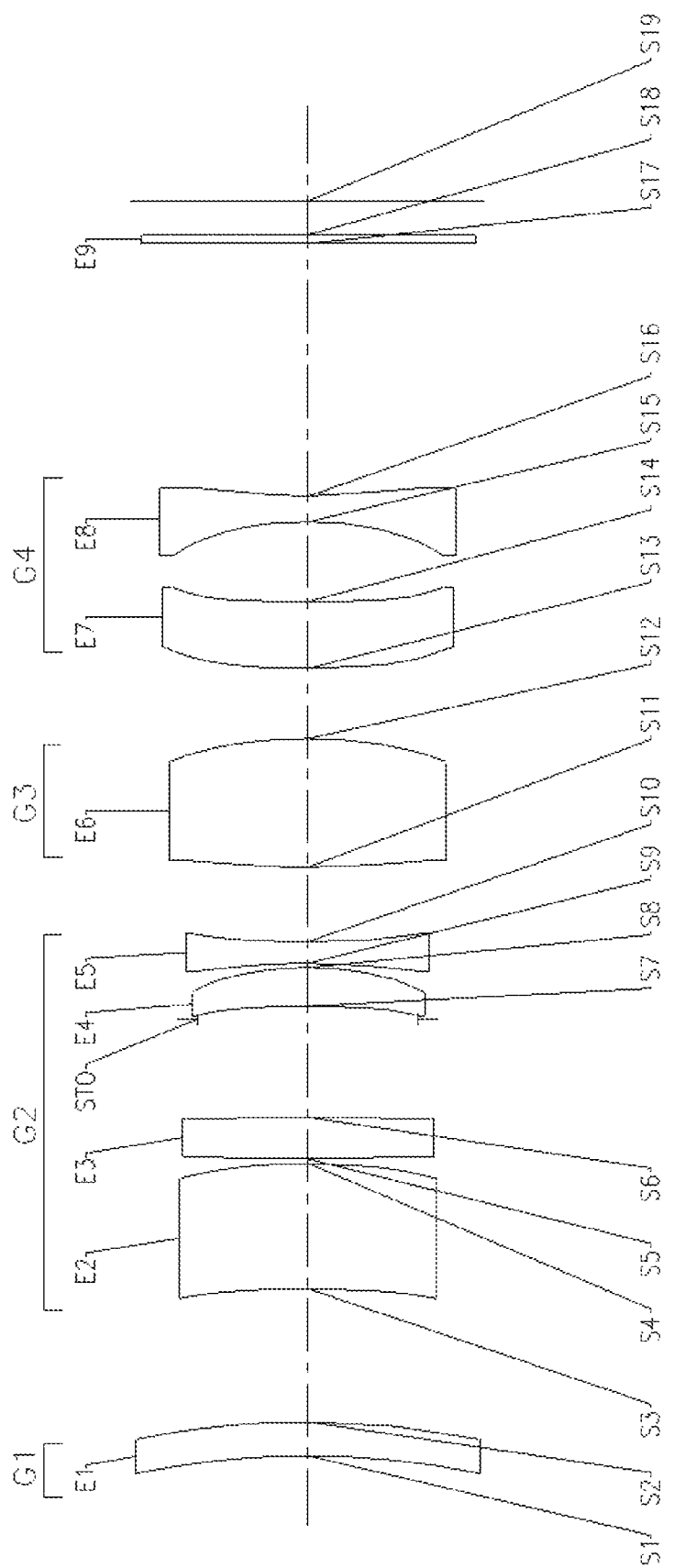
FIG. 8 shows a schematic structural view of a zoom lens group in an intermediate state during a transition from a wide-angle state to a telephoto state according to Example 2 of the present disclosure.
Figure 9:
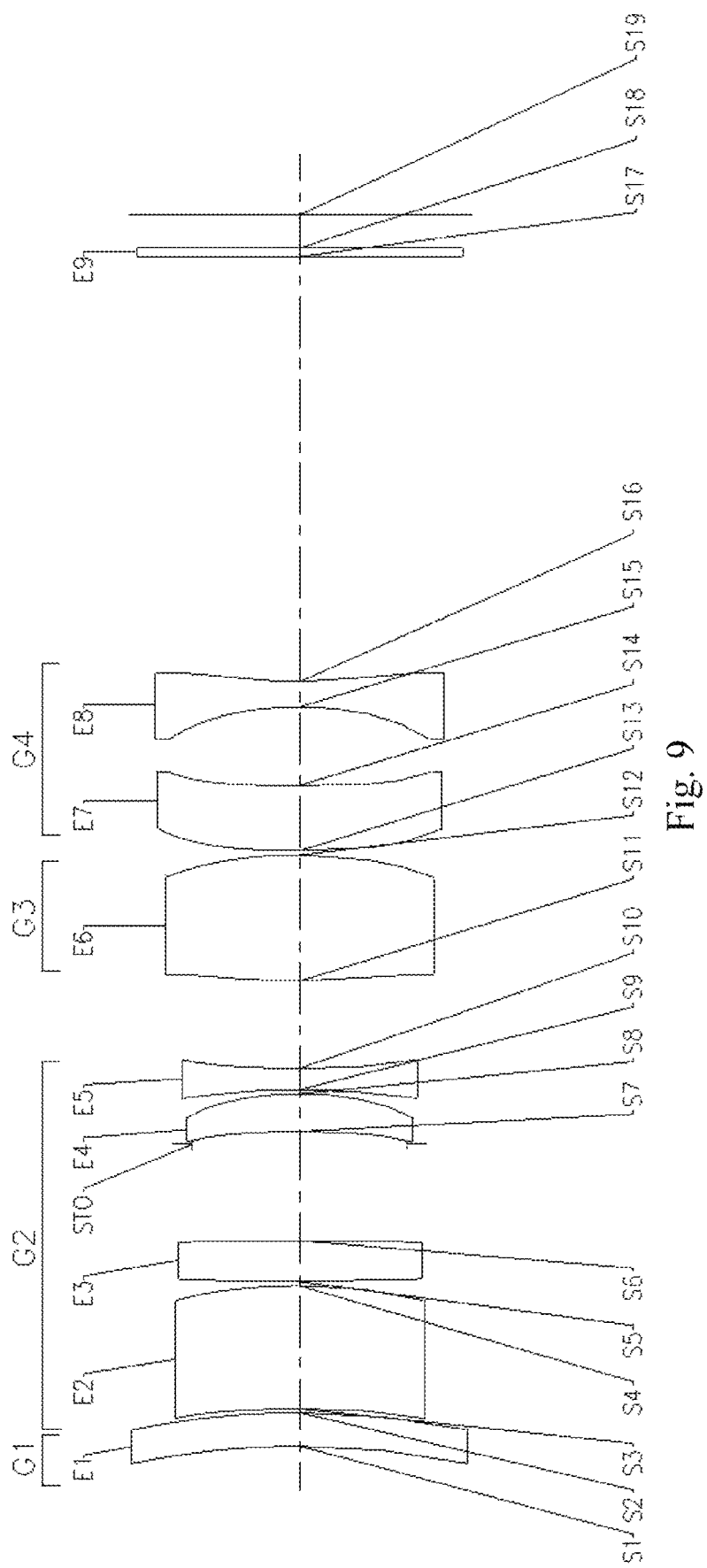
FIG. 9 shows a schematic structural view of a zoom lens group in a telephoto state according to Example 2 of the present disclosure.

FIG. 7 shows a schematic structural view of a zoom lens group in a wide-angle state according to Example 2 of the present disclosure. FIG. 8 shows a schematic structural view of a zoom lens group in an intermediate state during a transition from a wide-angle state to a telephoto state according to Example 2 of the present disclosure. FIG. 9 shows a schematic structural view of a zoom lens group in a telephoto state according to Example 2 of the present disclosure.

As shown in FIGS. 7 to 9, the zoom lens group sequentially includes a first lens group G1 (a first lens E1), a second lens group G2 (a second lens E2, a third lens E3, a fourth lens E4, and a fifth lens E5), a third lens group G3 (a sixth lens E6), a fourth lens group G4 (a seventh lens E7, and an eighth lens E8), an optical filter E9, and an imaging plane S19, from an object side to an imaging side along an optical axis. The zoom lens group further includes a stop STO disposed between the third lens E3 and the fourth lens E4 of the second lens group G2.

In this example, by changing the separation distance T1 between the first lens group and the second lens group along the optical axis (i.e., a separation distance between the image-side surface S2 of the first lens E1 and the object-side surface S3 of the second lens E2 along the optical axis), the separation distance T2 between the second lens group and the third lens group along the optical axis (i.e., a separation distance between the image-side surface S10 of the fifth lens E5 and the object-side surface S11 of the sixth lens E6 along the optical axis), the separation distance T3 between the third lens group and the fourth lens group along the optical axis (i.e., a separation distance between the image-side surface S12 of the sixth lens E6 and the object-side surface S13 of the seventh lens E7 along the optical axis), and the separation distance T4 between the fourth lens group and the optical filter along the optical axis (i.e., a separation distance between the image-side surface S16 of the eighth lens E8 and the object-side surface S17 of the optical filter E9 along the optical axis), the zoom lens group is switched from a wide-angle state to a telephoto state or from a telephoto state to a wide-angle state. A total effective focal length f, an aperture value Fno, and a maximum field-of-view FOV of the zoom lens group vary as the zoom lens group switches from the wide-angle state to the telephoto state or from the telephoto state to the wide-angle state. In the zoom lens group, a distance TTL from the object-side surface S1 of the first lens E1 to the imaging plane S19 of the zoom lens group along the optical axis remains unchanged in the wide-angle state, the telephoto state, and the intermediate state.

Table 5 shows a parameter table corresponding to the different states of the zoom lens group of Example 2, wherein units of f, T1, T2, T3 and T4 are all millimeters (mm) and unit of FOV is degrees (°).

TABLE 5

| Parameters | Wide-angle state | Intermediate state | Telephoto state |
|---|---|---|---|
| f | 14.14 | 18.92 | 23.37 |
| FOV | 33.3 | 25.0 | 20.3 |
| Fno | 2.65 | 3.55 | 4.31 |
| T1 | 6.5072 | 3.1374 | 0.0920 |
| T2 | 0.1334 | 1.7561 | 2.0983 |
| T3 | 4.2528 | 1.6558 | 0.1012 |
| T4 | 1.6121 | 5.9562 | 10.2141 |

Table 6 below shows high-order coefficients A4, A6, A8, A10, A12, A14, A16, A18 and A20 applicable to each aspheric surface S3 to S16 in Example 2.

TABLE 6

| Surface number | A4 | A6 | A8 | A10 | A12 |
|---|---|---|---|---|---|
| S3 | −1.7537E−01 | −1.1816E−02 | −3.2693E−03 | −1.7354E−03 | −9.1185E−04 |
| S4 | −1.0197E−01 | −1.7204E−02 | −1.6748E−03 | −2.0287E−03 | 6.3485E−04 |
| S5 | −6.1033E−03 | 6.9080E−03 | 2.8060E−03 | −8.5468E−04 | −2.6526E−05 |
| S6 | −1.6979E−02 | 7.1927E−03 | 1.7448E−03 | 1.6681E−04 | −2.3506E−05 |
| S7 | −2.2243E−02 | −2.2039E−02 | 9.3646E−05 | 2.7660E−04 | 1.0416E−05 |
| S8 | −5.5953E−02 | −2.4997E−02 | −7.4098E−04 | 1.7240E−03 | −7.5690E−04 |
| S9 | −4.4845E−02 | 1.6793E−02 | −1.5845E−03 | 8.3146E−03 | −2.6785E−03 |
| S10 | 1.6719E−02 | −1.1960E−02 | −1.1076E−02 | 9.9214E−03 | 3.0144E−04 |
| S11 | −1.4282E−01 | −8.0500E−03 | −3.4398E−04 | −1.8771E−05 | −1.3972E−05 |
| S12 | −1.4040E−01 | 4.5112E−02 | 1.9313E−03 | −2.4633E−03 | 2.2311E−03 |
| S13 | 3.6221E−01 | 1.2920E−03 | −4.8935E−03 | −2.2817E−03 | −3.6874E−04 |
| S14 | 3.2234E−01 | 1.7337E−03 | −5.6159E−03 | −3.6477E−03 | −9.1226E−04 |
| S15 | −5.9389E−01 | 4.3959E−02 | −2.4813E−02 | −2.0517E−03 | −1.6989E−03 |
| S16 | −6.6477E−01 | 4.7472E−02 | −2.5908E−02 | 9.5345E−03 | 1.1084E−03 |

| Surface number | A14 | A16 | A18 | A20 |
|---|---|---|---|---|
| S3 | −4.4000E−04 | −2.0721E−04 | −8.6350E−05 | −2.0882E−05 |
| S4 | 1.1297E−04 | 1.3863E−04 | −1.3673E−04 | 1.1272E−04 |
| S5 | −1.0837E−04 | 1.7108E−04 | −6.4284E−05 | 5.2859E−07 |
| S6 | −3.5285E−05 | 2.3557E−05 | 2.8322E−06 | −1.5262E−06 |
| S7 | −1.0404E−05 | 4.5977E−06 | 3.5704E−06 | −1.2376E−06 |
| S8 | 1.8117E−04 | −5.7783E−05 | −1.3774E−05 | −1.3254E−05 |
| S9 | −9.2124E−05 | −1.2757E−03 | 1.4735E−04 | −7.2445E−05 |
| S10 | −4.9453E−05 | −3.0316E−04 | 0.0000E+00 | 0.0000E+00 |
| S11 | −2.2791E−05 | −1.7145E−06 | 0.0000E+00 | 0.0000E+00 |
| S12 | 2.3773E−03 | 5.9876E−04 | 0.0000E+00 | 0.0000E+00 |
| S13 | −6.0607E−05 | −2.9186E−05 | 0.0000E+00 | 0.0000E+00 |
| S14 | −1.3301E−04 | −1.4676E−05 | 0.0000E+00 | 0.0000E+00 |
| S15 | −1.3051E−04 | −8.4649E−05 | 0.0000E+00 | 0.0000E+00 |
| S16 | 8.4518E−04 | −3.8407E−05 | 0.0000E+00 | 0.0000E+00 |

Figure 11A:
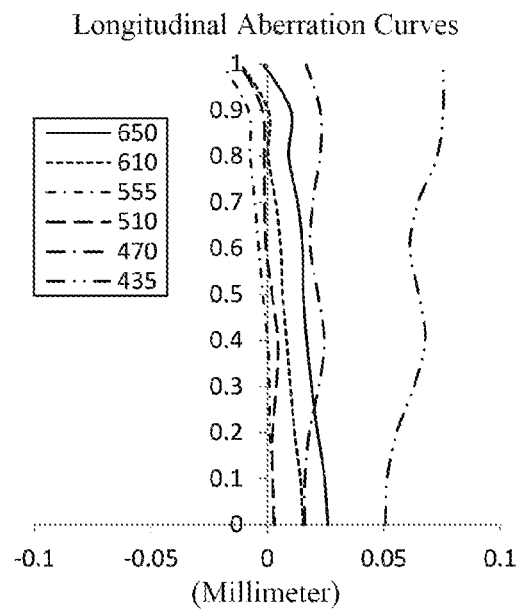
FIGS. 11A to 11C show longitudinal aberration curves, astigmatic curves, and a distortion curve, respectively, when the zoom lens group of Example 2 is in an intermediate state during a transition from a wide-angle state to a telephoto state.
Figure 11B:
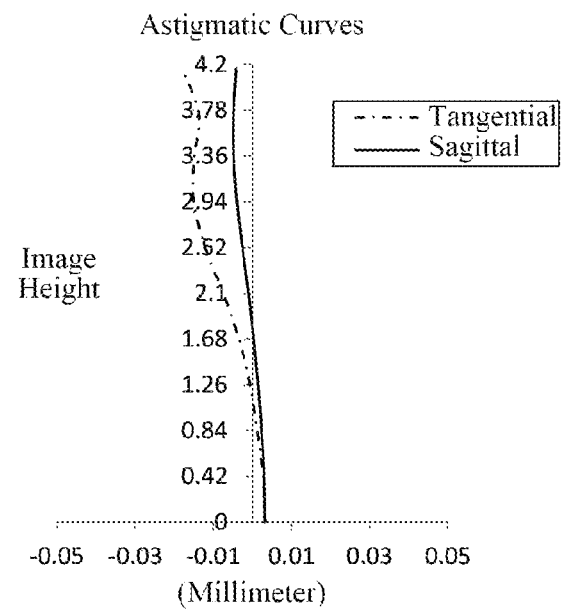
Figure 11C:
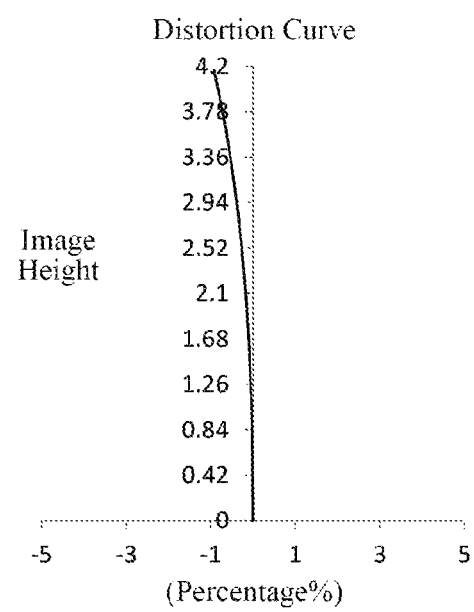
Figure 12A:
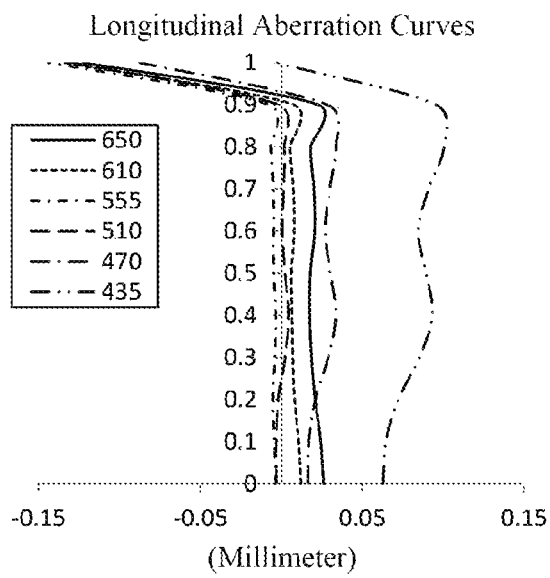
FIGS. 12A to 12C show longitudinal aberration curves, astigmatic curves, and a distortion curve, respectively, when the zoom lens group of Example 2 is in a telephoto state.
Figure 12B:
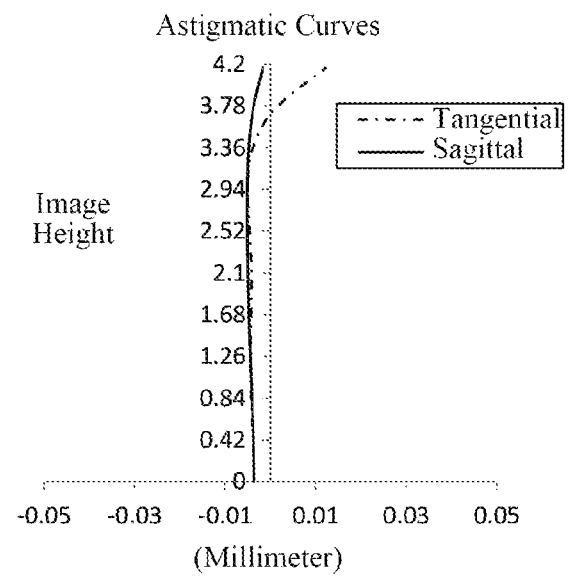
Figure 12C:
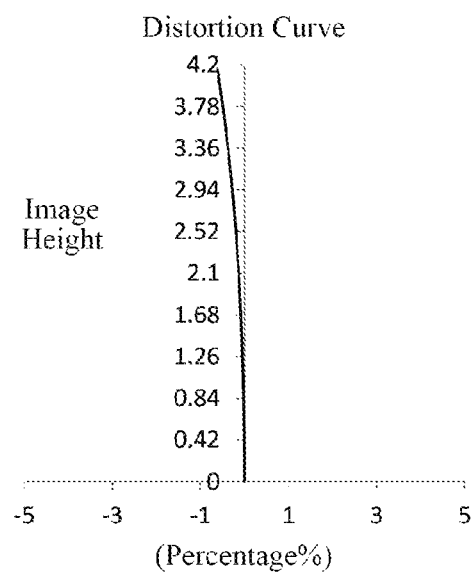

FIGS. 10A, 11A, and 12A show longitudinal aberration curves when the zoom lens group of Example 2 is in the wide-angle state, the intermediate state, and the telephoto state, respectively, representing the deviations of focal points converged by light of different wavelengths after passing through the lens assembly. FIGS. 10B, 11B, and 12B show astigmatic curves when the zoom lens group of Example 2 is in the wide-angle state, the intermediate state, and the telephoto state, respectively, representing the curvatures of a tangential plane and the curvatures of a sagittal plane. FIGS. 10C, 11C, and 12C show a distortion curve when the zoom lens group of Example 2 is in the wide-angle state, the intermediate state, and the telephoto state, respectively, representing the amounts of distortion corresponding to different image heights. As can be seen from FIGS. 10A to 12C, the zoom lens group according to Example 2 can achieve good imaging quality in each state.

Example 3

Figure 13:
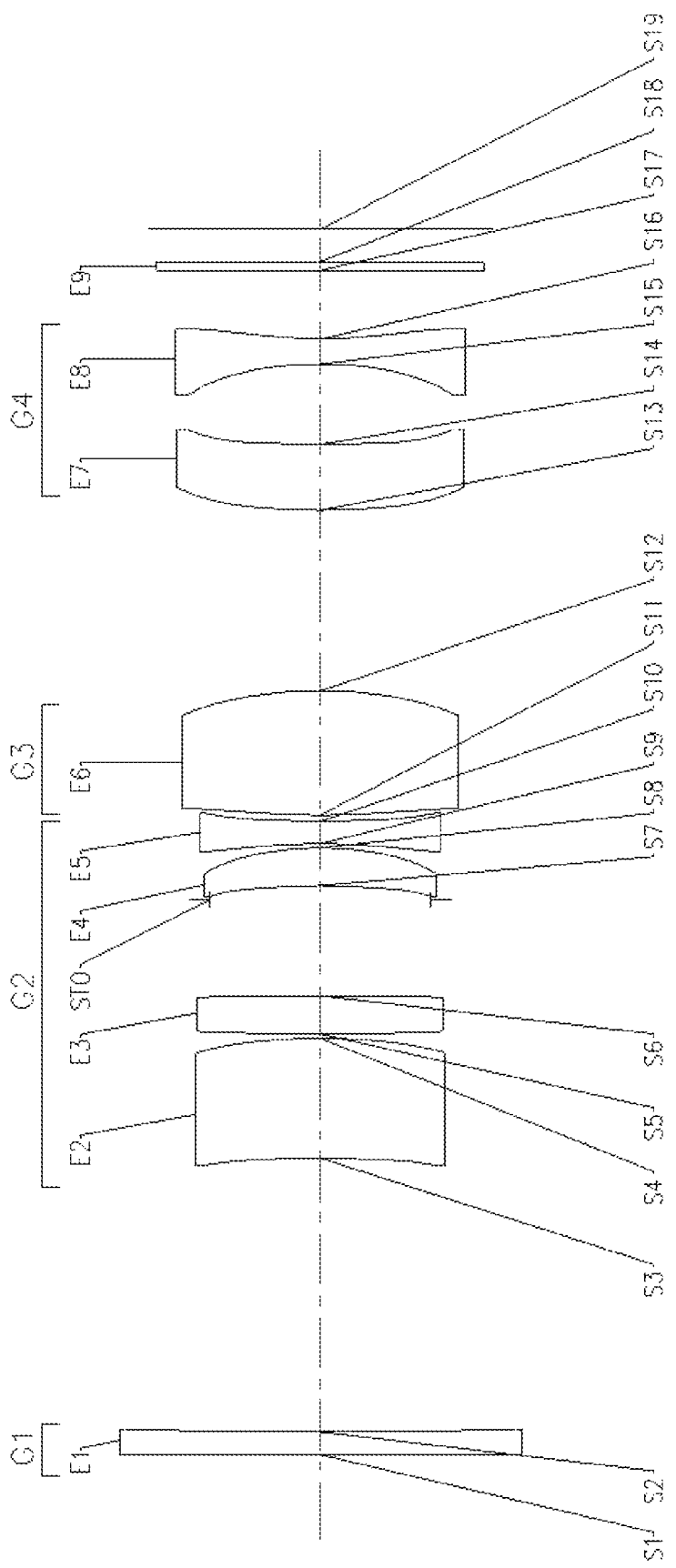
FIG. 13 shows a schematic structural view of a zoom lens group in a wide-angle state according to Example 3 of the present disclosure.
Figure 14:
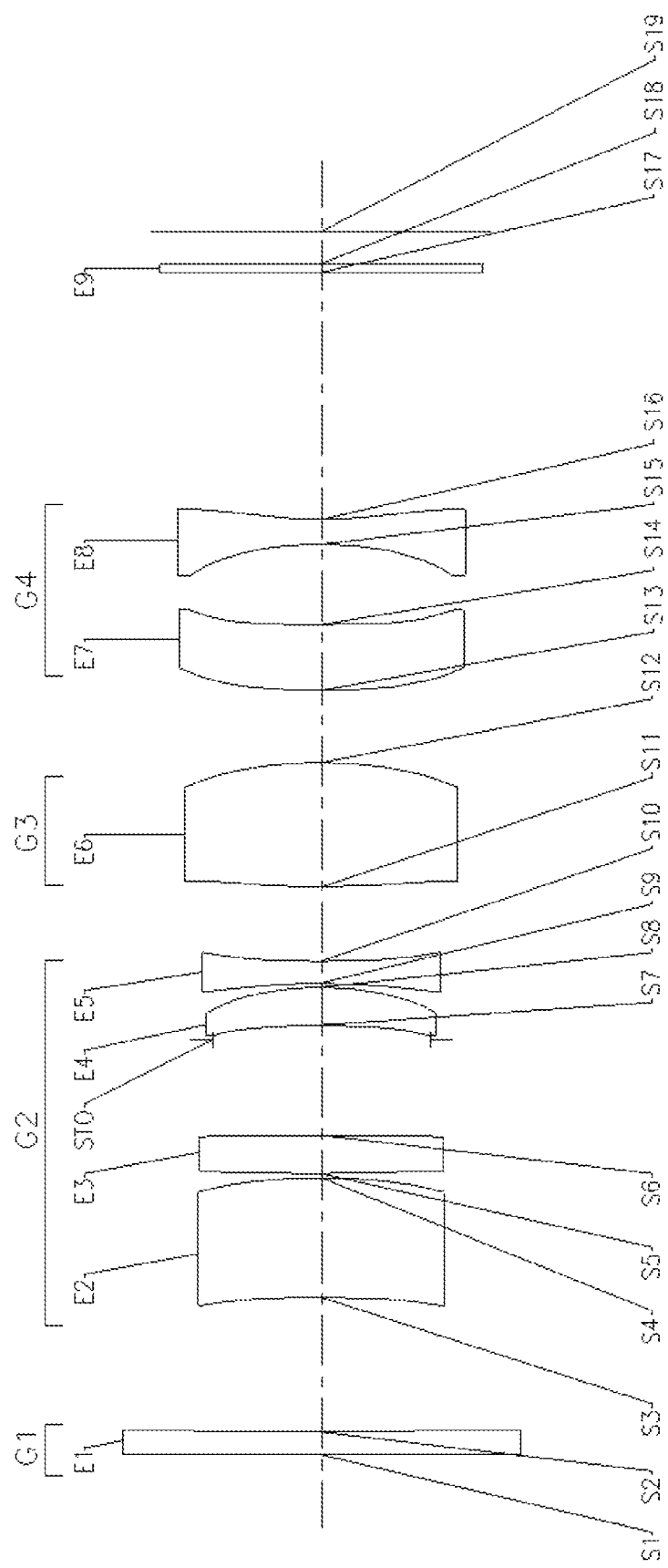
FIG. 14 shows a schematic structural view s of a zoom lens group in an intermediate state during a transition from a wide-angle state to a telephoto state according to Example 3 of the present disclosure.
Figure 15:
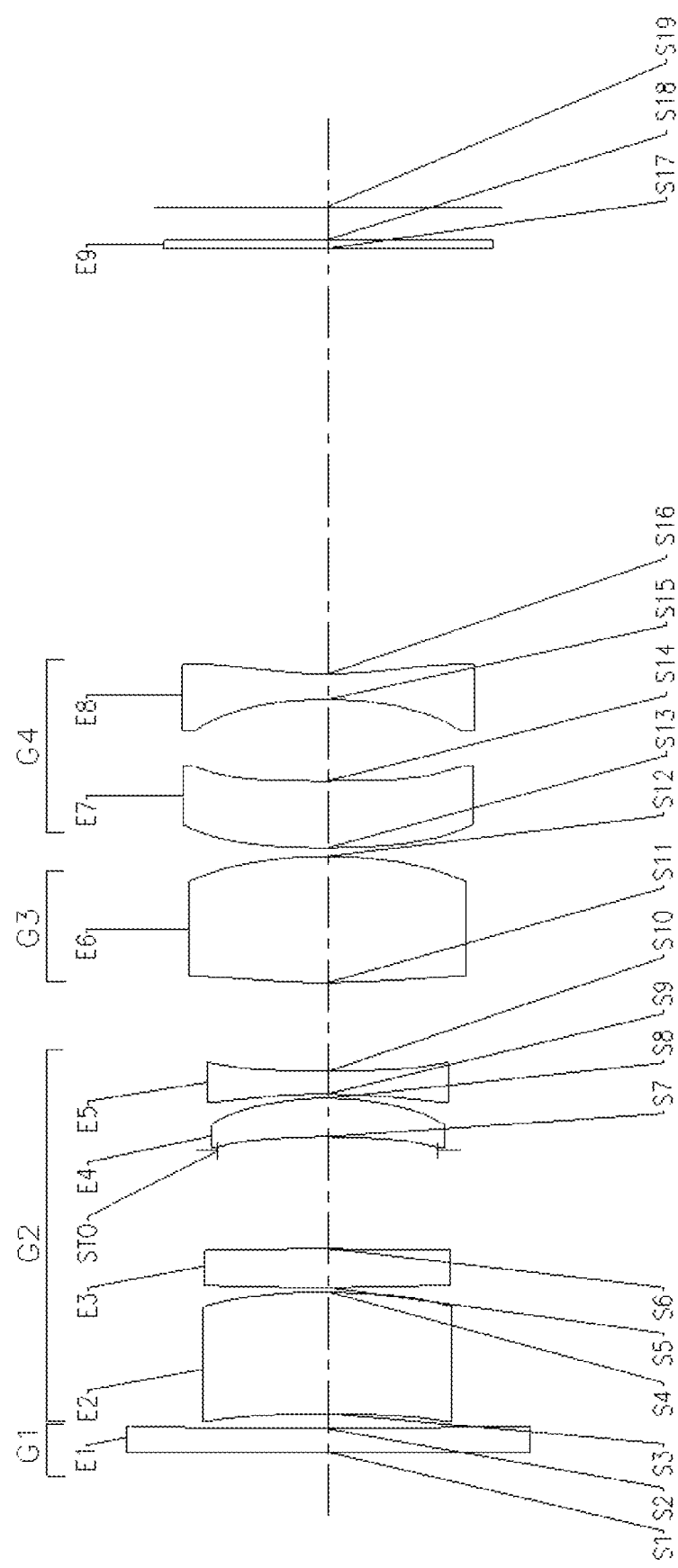
FIG. 15 shows a schematic structural view of a zoom lens group in a telephoto state according to Example 3 of the present disclosure.

A zoom lens group according to Example 3 of the present disclosure is described below with reference to FIGS. 13 to 18C. FIG. 13 shows a schematic structural view of a zoom lens group in a wide-angle state according to Example 3 of the present disclosure. FIG. 14 shows a schematic structural view of a zoom lens group in an intermediate state during a transition from a wide-angle state to a telephoto state according to Example 3 of the present disclosure. FIG. 15 shows a schematic structural view of a zoom lens group in a telephoto state according to Example 3 of the present disclosure.

As shown in FIGS. 13 to 15, the zoom lens group sequentially includes a first lens group G1 (a first lens E1), a second lens group G2 (a second lens E2, a third lens E3, a fourth lens E4, and a fifth lens E5), a third lens group G3 (a sixth lens E6), a fourth lens group G4 (a seventh lens E7, and an eighth lens E8), an optical filter E9, and an imaging plane S19, from an object side to an imaging side along an optical axis. The zoom lens group further includes a stop STO disposed between the third lens E3 and the fourth lens E4 of the second lens group G2.

An object-side surface S1 of the first lens E1 is a flat surface, and an image-side surface S2 thereof is a concave surface. An object-side surface S3 of the second lens E2 is a concave surface, and an image-side surface S4 thereof is a convex surface. An object-side surface S5 of the third lens E3 is a convex surface, and an image-side surface S6 thereof is a convex surface. An object-side surface S7 of the fourth lens E4 is a concave surface, and an image-side surface S8 thereof is a convex surface. An object-side surface S9 of the fifth lens E5 is a concave surface, and an image-side surface S10 thereof is a concave surface. An object-side surface S11 of the sixth lens E6 is a convex surface, and an image-side surface S12 thereof is a convex surface. An object-side surface S13 of the seventh lens E7 is a convex surface, and an image-side surface S14 thereof is a concave surface. An object-side surface S15 of the eighth lens E8 is a concave surface, and an image-side surface S16 thereof is a concave surface. The optical filter E9 has an object-side surface S17 and an image-side surface S18. Light from the object sequentially passes through the respective surfaces S1 to S18 and is finally imaged on the imaging plane S19.

Table 7 is a table showing the basic parameters of the zoom lens group of Example 3, wherein the radius of curvature, the thickness, and the focal length are all in units of millimeters (mm).

TABLE 7

| Surface number | Surface type | Radius of curvature | Thickness/ Distance | Material Refractive index | Abbe number | Conic coefficient |
|---|---|---|---|---|---|---|
| OBJ | Spherical | Infinite | Infinite | | | |
| S1 | Spherical | Infinite | 0.5500 | 1.546 | 56.13 | 0.0000 |
| S2 | Spherical | 206.8636 | T1 | | | 0.0000 |
| S3 | Aspheric | −36.4221 | 2.8910 | 1.546 | 56.13 | 10.1965 |
| S4 | Aspheric | −15.1316 | 0.1000 | | | 0.5016 |
| S5 | Aspheric | 65.9417 | 0.9264 | 1.677 | 19.24 | 43.4274 |
| S6 | Aspheric | −178.5576 | 2.3201 | | | −79.6792 |
| STO | Spherical | Infinite | 0.3375 | | | |
| S7 | Aspheric | −16.9472 | 0.9168 | 1.546 | 56.13 | −11.3876 |
| S8 | Aspheric | −7.5512 | 0.1000 | | | 0.4095 |
| S9 | Aspheric | −19.2243 | 0.5309 | 1.677 | 19.24 | −23.8176 |
| S10 | Aspheric | 25.5206 | T2 | | | 44.7356 |
| S11 | Aspheric | 18.9623 | 3.0019 | 1.546 | 56.13 | 22.8720 |
| S12 | Aspheric | −11.5786 | T3 | | | 4.7162 |
| S13 | Aspheric | 23.5037 | 1.5856 | 1.677 | 19.24 | 5.8750 |
| S14 | Aspheric | 96.5388 | 1.9376 | | | 99.0000 |
| S15 | Aspheric | −11.5503 | 0.6000 | 1.537 | 55.71 | −54.9469 |
| S16 | Aspheric | 8.7634 | T4 | | | −4.8607 |
| S17 | Spherical | Infinite | 0.2100 | 1.518 | 64.17 | |
| S18 | Spherical | Infinite | 0.7817 | | | |
| S19 | Spherical | Infinite | | | | |

In this example, by changing the separation distance T1 between the first lens group and the second lens group along the optical axis (i.e., a separation distance between the image-side surface S2 of the first lens E1 and the object-side surface S3 of the second lens E2 along the optical axis), the separation distance T2 between the second lens group and the third lens group along the optical axis (i.e., a separation distance between the image-side surface S10 of the fifth lens E5 and the object-side surface S11 of the sixth lens E6 along the optical axis), the separation distance T3 between the third lens group and the fourth lens group along the optical axis (i.e., a separation distance between the image-side surface S12 of the sixth lens E6 and the object-side surface S13 of the seventh lens E7 along the optical axis), and the separation distance T4 between the fourth lens group and the optical filter along the optical axis (i.e., a separation distance between the image-side surface S16 of the eighth lens E8 and the object-side surface S17 of the optical filter E9 along the optical axis), the zoom lens group is switched from a wide-angle state to a telephoto state or from a telephoto state to a wide-angle state. A total effective focal length f, an aperture value Fno, and a maximum field-of-view FOV of the zoom lens group vary as the zoom lens group switches from the wide-angle state to the telephoto state or from the telephoto state to the wide-angle state. In the zoom lens group, a distance TTL from the object-side surface S1 of the first lens E1 to the imaging plane S19 of the zoom lens group along the optical axis remains unchanged in the wide-angle state, the telephoto state, and the intermediate state.

Table 8 shows a parameter table corresponding to the different states of the zoom lens group of Example 3, wherein units of f, T1, T2, T3 and T4 are all millimeters (mm) and unit of FOV is degrees (°).

TABLE 8

| Parameter | Wide-angle state | Intermediate state | Telephoto state |
|---|---|---|---|
| f | 14.13 | 18.93 | 23.35 |
| FOV | 33.3 | 25.0 | 20.3 |
| Fno | 2.63 | 3.50 | 4.27 |

TABLE 8-continued

| Parameter | Wide-angle state | Intermediate state | Telephoto state |
|---|---|---|---|
| T1 | 6.6074 | 3.2541 | 0.3620 |
| T2 | 0.1536 | 1.7986 | 2.1086 |
| T3 | 4.3600 | 1.7514 | 0.2024 |
| T4 | 1.6594 | 5.9764 | 10.1076 |

Table 9 below shows high-order coefficients A4, A6, A8, A10, A12, A14, A16, A18 and A20 applicable to each aspheric surface S3 to S16 in Example 3.

TABLE 9

| Surface number | A4 | A6 | A8 | A10 | A12 |
|---|---|---|---|---|---|
| S3 | −1.7981E−01 | −1.2289E−02 | −3.5207E−03 | −1.6846E−03 | −7.8300E−04 |
| S4 | −1.0512E−01 | −1.8015E−02 | −1.7718E−03 | −1.9070E−03 | 8.0993E−04 |
| S5 | −5.7155E−03 | 6.5572E−03 | 3.3794E−03 | −6.2442E−04 | −2.2183E−04 |
| S6 | −1.7743E−02 | 6.7311E−03 | 1.9921E−03 | 4.6020E−04 | −9.9492E−05 |
| S7 | −2.1499E−02 | −2.2015E−02 | 1.8118E−04 | 5.6026E−04 | −5.0181E−05 |
| S8 | −5.4926E−02 | −2.3545E−02 | −6.2152E−04 | 2.1496E−03 | −1.0672E−03 |
| S9 | −4.1452E−02 | 1.7251E−02 | −1.7930E−02 | 9.1433E−03 | −2.7843E−03 |
| S10 | 2.1156E−02 | −1.2830E−02 | −1.2536E−02 | 1.0589E−02 | 2.8799E−04 |
| S11 | −1.4489E−01 | −8.5006E−03 | −4.6255E−04 | −3.2556E−05 | −1.3535E−05 |
| S12 | −1.7141E−01 | 4.3723E−02 | 3.0390E−03 | −2.0608E−03 | 1.8853E−03 |
| S13 | 3.5718E−01 | 2.3795E−04 | −5.1958E−03 | −1.8422E−03 | −2.9505E−03 |
| S14 | 3.2022E−01 | −8.4844E−05 | −6.4093E−03 | −2.9780E−03 | −5.7934E−04 |
| S15 | −5.7326E−01 | 3.4031E−02 | −2.9041E−02 | −2.4033E−03 | −1.8754E−03 |
| S16 | −6.5096E−01 | 3.5088E−02 | −2.6101E−02 | 1.0469E−02 | 1.1699E−03 |

| Surface number | A14 | A16 | A18 | A20 |
|---|---|---|---|---|
| S3 | −3.6877E−04 | −1.5748E−04 | −6.3187E−05 | −1.7752E−05 |
| S4 | 4.1513E−04 | 2.8218E−04 | −1.7472E−05 | 1.2399E−04 |
| S5 | −5.5307E−05 | 1.4320E−04 | −7.6224E−05 | 3.9970E−06 |
| S6 | −2.6395E−05 | 2.9678E−05 | −9.6758E−07 | −1.4721E−06 |
| S7 | −1.9509E−05 | 5.3880E−06 | 2.4780E−06 | −5.2863E−07 |
| S8 | 3.0930E−04 | −4.9801E−05 | −2.6077E−06 | −7.5843E−06 |
| S9 | −3.0826E−04 | −1.2420E−03 | 4.1285E−04 | −2.3857E−05 |
| S10 | −1.7385E−04 | −2.8435E−04 | 0.0000E+00 | 0.0000E+00 |
| S11 | −1.5031E−05 | −1.8636E−07 | 0.0000E+00 | 0.0000E+00 |
| S12 | 1.8593E−03 | 4.8839E−04 | 0.0000E+00 | 0.0000E+00 |
| S13 | −1.1503E−04 | −4.2295E−05 | 0.0000E+00 | 0.0000E+00 |
| S14 | −8.9020E−05 | −1.5187E−05 | 0.0000E+00 | 0.0000E+00 |
| S15 | −2.2601E−04 | −1.0128E−04 | 0.0000E+00 | 0.0000E+00 |
| S16 | 9.4656E−04 | 3.9256E−05 | 0.0000E+00 | 0.0000E+00 |

Figure 16A:
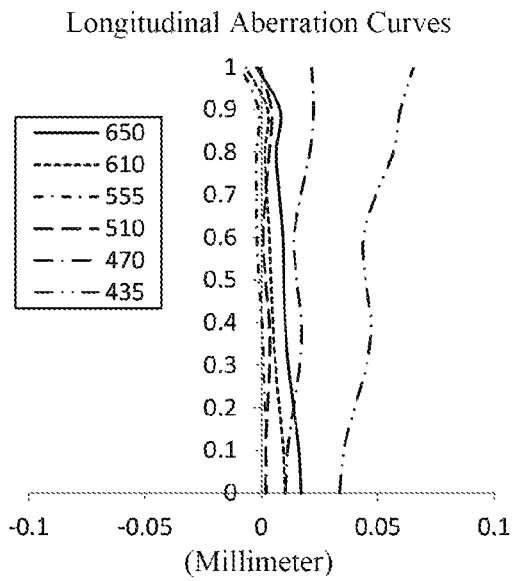
FIGS. 16A to 16C show longitudinal aberration curves, astigmatic curves and a distortion curve, respectively, when the zoom lens group of Example 3 is in a wide-angle state.
Figure 16B:
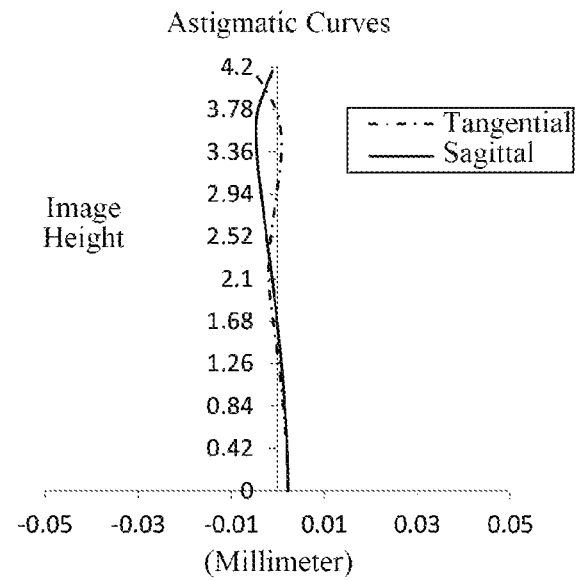
Figure 16C:
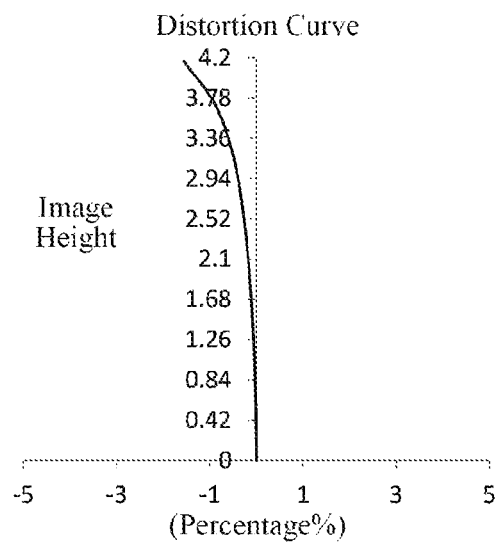
Figure 17A:
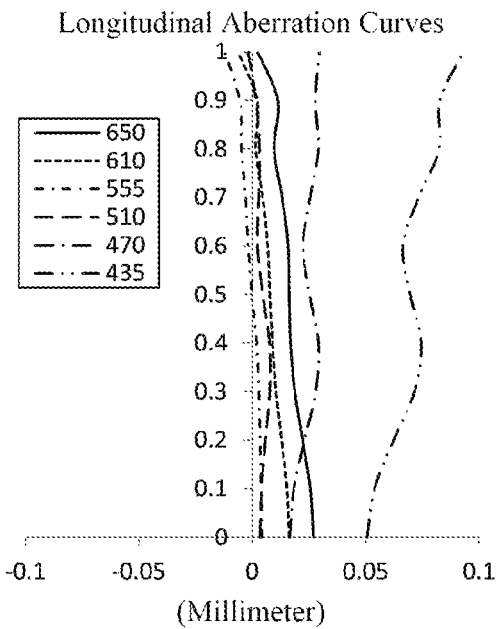
FIGS. 17A to 17C show longitudinal aberration curves, astigmatic curves, and a distortion curve, respectively, when the zoom lens group of Example 3 is in an intermediate state during a transition from a wide-angle state to a telephoto state.
Figure 17B:
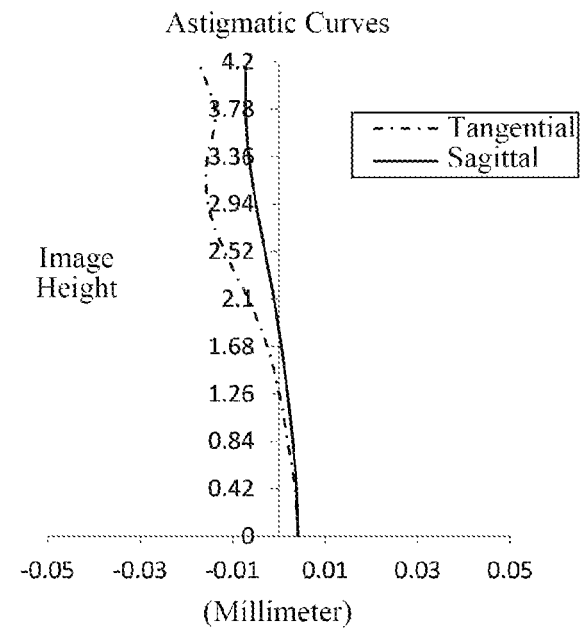
Figure 17C:
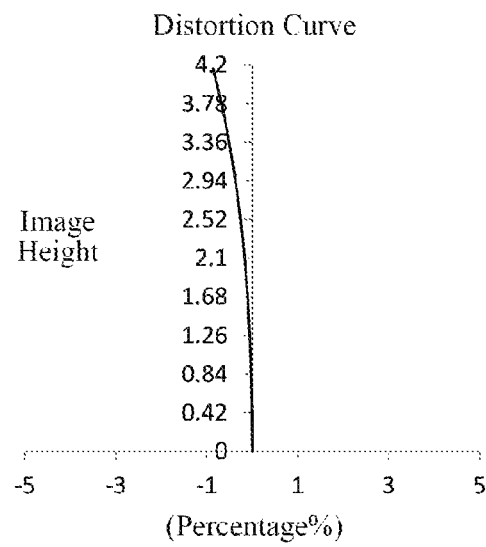

FIGS. 16A, 17A, and 18A show longitudinal aberration curves when the zoom lens group of Example 3 is in the wide-angle state, the intermediate state, and the telephoto state, respectively, representing the deviations of focal points converged by light of different wavelengths after passing through the lens assembly. FIGS. 16B, 17B, and 18B show astigmatic curves when the zoom lens group of Example 3 is in the wide-angle state, the intermediate state, and the telephoto state, respectively, representing the curvatures of a tangential plane and the curvatures of a sagittal plane. FIGS. 16C, 17C, and 18C show a distortion curve when the zoom lens group of the Example 3 is in the wide-angle state, the intermediate state, and the telephoto state, respectively, representing the amounts of distortion corresponding to different image heights. As can be seen from FIGS. 16A to 18C, the zoom lens group according to Example 3 can achieve good imaging quality in each state.

Example 4

Figure 19:
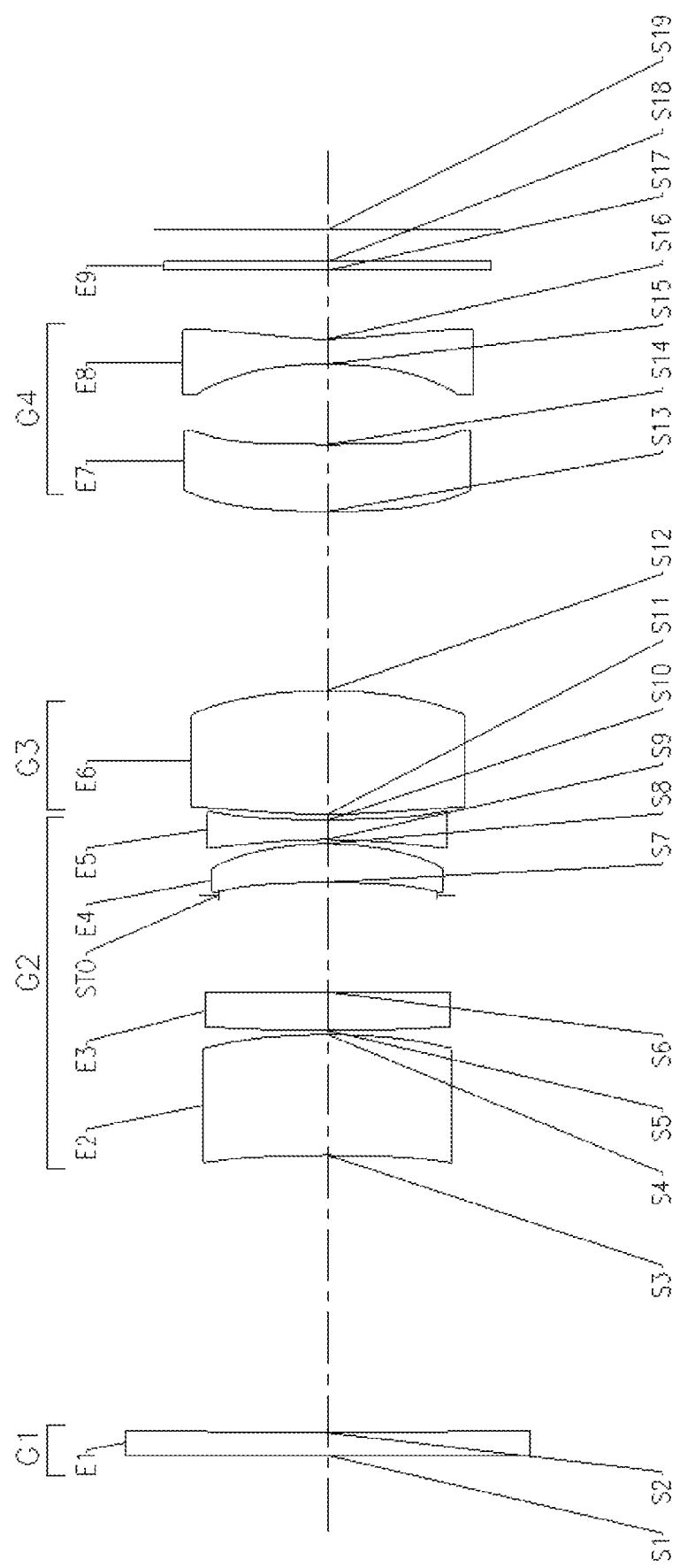
FIG. 19 shows a schematic structural view of a zoom lens group in a wide-angle state according to Example 4 of the present disclosure.
Figure 20:
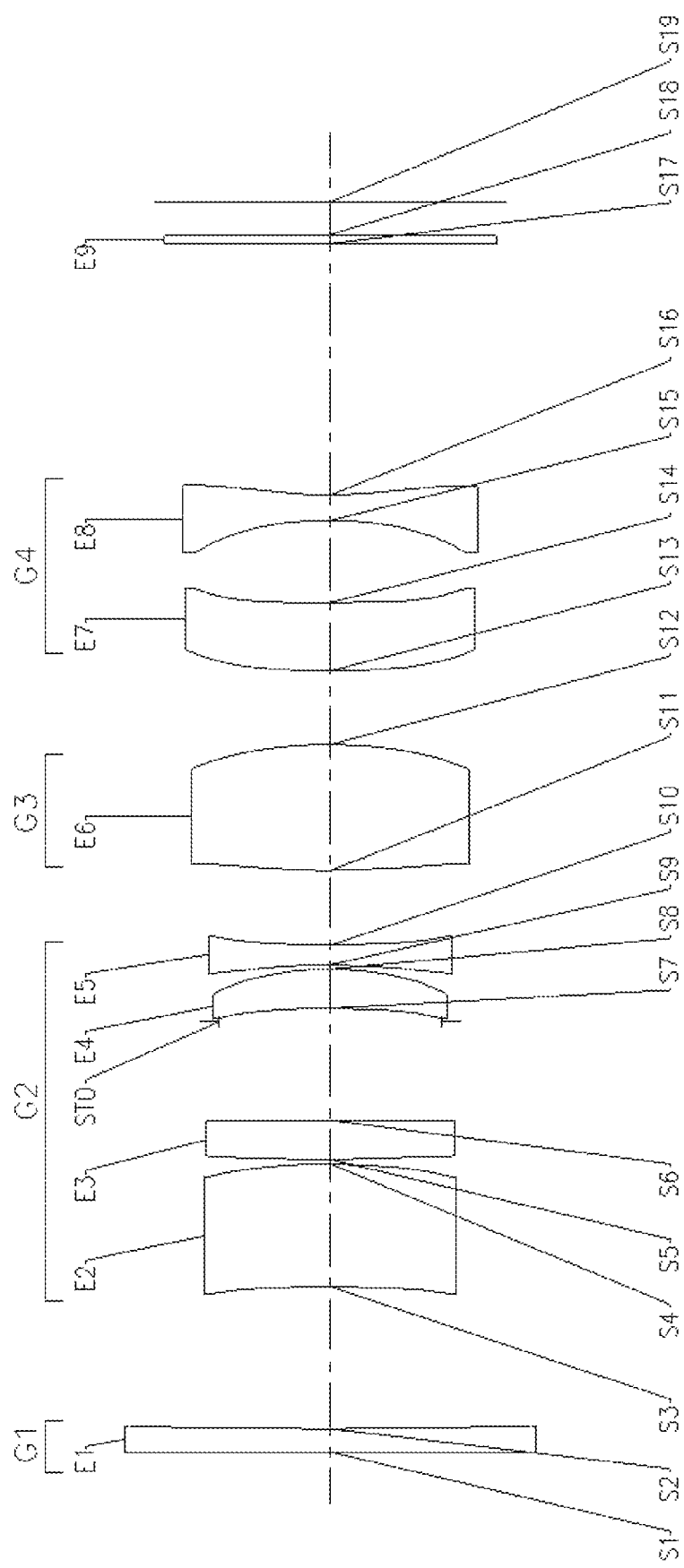
FIG. 20 shows a schematic structural view s of a zoom lens group in an intermediate state during a transition from a wide-angle state to a telephoto state according to Example 4 of the present disclosure.
Figure 21:
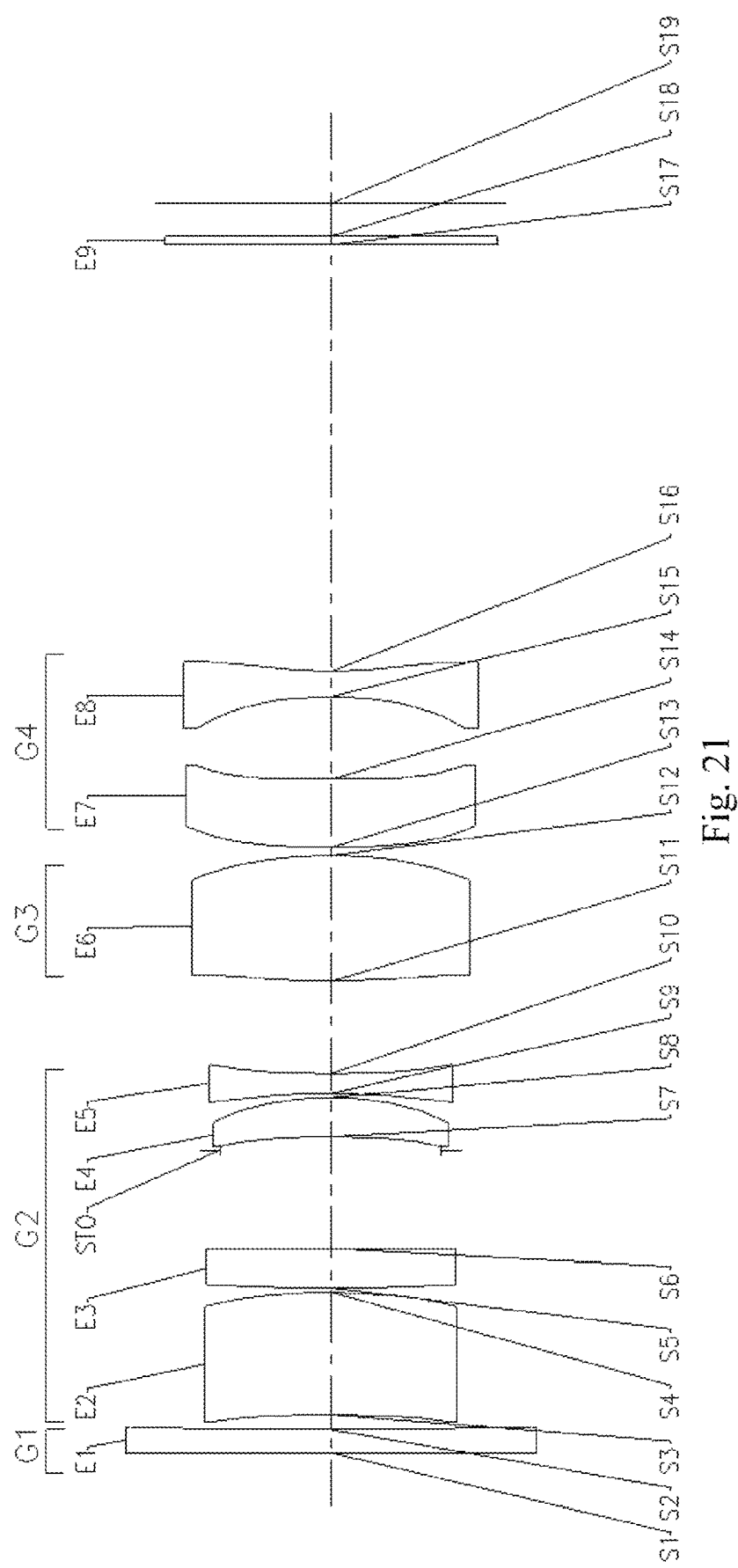
FIG. 21 shows a schematic structural view of a zoom lens group in a telephoto state according to Example 4 of the present disclosure.

A zoom lens group according to Example 4 of the present disclosure is described below with reference to FIGS. 19 to 24C. FIG. 19 shows a schematic structural view of a zoom lens group in a wide-angle state according to Example 4 of the present disclosure. FIG. 20 shows a schematic structural view of a zoom lens group in an intermediate state during a transition from a wide-angle state to a telephoto state according to Example 4 of the present disclosure. FIG. 21 shows a schematic structural view of a zoom lens group in a telephoto state according to Example 4 of the present disclosure.

As shown in FIGS. 19 to 21, the zoom lens group sequentially includes a first lens group G1 (a first lens E1), a second lens group G2 (a second lens E2, a third lens E3, a fourth lens E4, and a fifth lens E5), a third lens group G3 (a sixth lens E6), a fourth lens group G4 (a seventh lens E7, and an eighth lens E8), an optical filter E9, and an imaging plane S19, from an object side to an imaging side along an optical axis. The zoom lens group further includes a stop STO disposed between the third lens E3 and the fourth lens E4 of the second lens group G2.

An object-side surface S1 of the first lens E1 is a flat surface, and image-side surface S2 thereof is a concave surface. An object-side surface S3 of the second lens E2 is a concave surface, and image-side surface S4 thereof is a convex surface. An object-side surface S5 of the third lens E3 is a convex surface, and an image-side surface S6 thereof is a convex surface. An object-side surface S7 of the fourth lens E4 is a concave surface, and an image-side surface S8 thereof is a convex surface. An object-side surface S9 of the fifth lens E5 is a concave surface, and an image-side surface S10 thereof is a concave surface. An object-side surface S11 of the sixth lens E6 is a convex surface, and an image-side surface S12 thereof is a convex surface. An object-side surface S13 of the seventh lens E7 is a convex surface, and an image-side surface S14 thereof is a concave surface. An object-side surface S15 of the eighth lens E8 is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 10 is a table showing the basic parameters of the zoom lens group of Example 4, wherein the radius of curvature, the thickness, and the focal length are all in units of millimeters (mm).

TABLE 10

| Surface number | Surface type | Radius of curvature | Thickness/ Distance | Material Refractive index | Abbe number | Conic coefficient |
|---|---|---|---|---|---|---|
| OBJ | Spherical | Infinite | Infinite | | | |
| S1 | Spherical | Infinite | 0.5500 | 1.546 | 56.13 | 0.0000 |
| S2 | Spherical | 202.1825 | T1 | | | 0.0000 |
| S3 | Aspheric | −40.3400 | 2.9072 | 1.546 | 56.13 | 6.6626 |
| S4 | Aspheric | −15.8427 | 0.1000 | | | 0.6170 |
| S5 | Aspheric | 48.8139 | 0.9288 | 1.677 | 19.24 | 29.3400 |
| S6 | Aspheric | −3683.6370 | 2.3313 | | | −99.0000 |
| STO | Spherical | Infinite | 0.3234 | | | |
| S7 | Aspheric | −17.0600 | 0.9233 | 1.546 | 56.13 | −13.1836 |
| S8 | Aspheric | −7.6544 | 0.1000 | | | 0.3058 |
| S9 | Aspheric | −19.6725 | 0.4694 | 1.677 | 19.24 | −23.6771 |
| S10 | Aspheric | 25.1279 | T2 | | | 41.9644 |
| S11 | Aspheric | 18.1718 | 2.9844 | 1.546 | 56.13 | 22.1630 |
| S12 | Aspheric | −11.6099 | T3 | | | 4.5995 |
| S13 | Aspheric | 26.1425 | 1.6143 | 1.677 | 19.24 | 7.3829 |
| S14 | Aspheric | 169.9460 | 1.9456 | | | 94.3949 |
| S15 | Aspheric | −11.5779 | 0.6000 | 1.537 | 55.71 | −48.2693 |
| S16 | Aspheric | 8.6893 | T4 | | | −5.4465 |
| S17 | Spherical | Infinite | 0.2100 | 1.518 | 64.17 | |
| S18 | Spherical | Infinite | 0.7681 | | | |
| S19 | Spherical | Infinite | | | | |

In this example, by changing the separation distance T1 between the first lens group and the second lens group along the optical axis (i.e., a separation distance between the image-side surface S2 of the first lens E1 and the object-side surface S3 of the second lens E2 along the optical axis), the separation distance T2 between the second lens group and the third lens group along the optical axis (i.e., a separation distance between the image-side surface S10 of the fifth lens E5 and the object-side surface S11 of the sixth lens E6 along the optical axis), the separation distance T3 between the third lens group and the fourth lens group along the optical axis (i.e., a separation distance between the image-side surface S12 of the sixth lens E6 and the object-side surface S13 of the seventh lens E7 along the optical axis), and the separation distance T4 between the fourth lens group and the optical filter along the optical axis (i.e., a separation distance between the image-side surface S16 of the eighth lens E8 and the object-side surface S17 of the optical filter E9 along the optical axis), the zoom lens group is switched from a wide-angle state to a telephoto state or from a telephoto state to a wide-angle state. A total effective focal length f, an aperture value Fno, and a maximum field-of-view FOV of the zoom lens group vary as the zoom lens group switches from the wide-angle state to the telephoto state or from the telephoto state to the wide-angle state. In the zoom lens group, a distance TTL from the object-side surface S1 of the first lens E1 to the imaging plane S19 of the zoom lens group along the optical axis remains unchanged in the wide-angle state, the telephoto state, and the intermediate state.

Table 11 shows a parameter table corresponding to the different states of the zoom lens group of Example 4, wherein units of f, T1, T2, T3 and T4 are all millimeters (mm) and unit of FOV is degrees (°).

TABLE 11

| Parameters | Wide-angle state | Intermediate state | Telephoto state |
|---|---|---|---|
| f | 14.11 | 18.88 | 23.36 |
| FOV | 33.3 | 25.0 | 20.3 |
| Fno | 2.63 | 3.50 | 4.27 |
| T1 | 6.6959 | 3.3616 | 0.3506 |
| T2 | 0.1394 | 1.7601 | 2.1762 |
| T3 | 4.3210 | 1.7416 | 0.1949 |
| T4 | 1.6579 | 5.9509 | 10.0925 |

Table 12 below shows high-order coefficients A4, A6, A8, A10, A12, A14, A16, A18 and A20 applicable to each aspheric surface S3 to S16 in Example 3.

TABLE 12

| Surface number | A4 | A6 | A8 | A10 | A12 |
|---|---|---|---|---|---|
| S3 | −1.7864E−01 | −1.2575E−02 | −3.6490E−03 | −1.6439E−03 | −8.1776E−04 |
| S4 | −1.0557E−01 | −1.6916E−02 | −1.8809E−03 | −1.9324E−03 | 5.5204E−04 |
| S5 | −7.0803E−03 | 6.8278E−03 | 4.3266E−03 | −4.1313E−04 | −3.3082E−04 |
| S6 | −1.6793E−02 | 6.0760E−03 | 2.6766E−03 | 4.8787E−04 | −1.0612E−04 |
| S7 | −1.9891E−02 | −2.1218E−02 | 4.0253E−04 | 5.5198E−04 | −2.2635E−05 |
| S8 | −5.2920E−02 | −2.1936E−02 | −1.2920E−04 | 2.1486E−03 | −8.8946E−04 |
| S9 | −4.1574E−02 | 1.7947E−02 | −1.7523E−02 | 8.3796E−03 | −2.6371E−03 |
| S10 | 1.8698E−02 | −1.3974E−02 | −1.1679E−02 | 1.0021E−02 | 8.3492E−03 |
| S11 | −1.4701E−01 | −9.0080E−03 | −7.0919E−04 | −6.1840E−05 | −1.9870E−05 |
| S12 | −1.8302E−01 | 4.2986E−02 | 2.8917E−03 | −1.9653E−03 | 1.8739E−03 |
| S13 | 3.5934E−01 | 2.1407E−03 | −3.7225E−03 | −1.9039E−03 | −3.7617E−04 |
| S14 | 3.2238E−01 | 3.8781E−03 | −3.8960E−03 | −2.6868E−03 | −6.4275E−04 |

TABLE 12-continued

| | | | | |
|---|---|---|---|---|
| S15 | −5.8741E−01 | 4.7452E−02 | −2.5343E−02 | −1.4621E−03 | −1.5703E−03 |
| S16 | −6.6271E−01 | 4.9517E−02 | −3.0942E−02 | 8.9846E−03 | 1.7175E−04 |

| Surface number | A14 | A16 | A18 | A20 |
|---|---|---|---|---|
| S3 | −3.9375E−04 | −1.7132E−04 | −6.6961E−05 | −1.8051E−05 |
| S4 | 5.3555E−04 | 2.5140E−04 | 4.3959E−05 | 1.0443E−04 |
| S5 | 2.6091E−05 | 1.0700E−04 | −4.9758E−05 | 8.1437E−06 |
| S6 | −1.4656E−05 | 2.5794E−05 | −1.8958E−06 | 3.4580E−07 |
| S7 | −1.3548E−05 | 4.7079E−06 | 2.5920E−06 | −5.1506E−07 |
| S8 | 2.3929E−04 | −3.9683E−05 | −6.2428E−06 | −7.7184E−06 |
| S9 | −6.4518E−05 | −1.1886E−03 | 2.9897E−04 | −2.0953E−05 |
| S10 | 2.5716E−04 | −1.6307E−04 | 0.0000E+00 | 0.0000E+00 |
| S11 | −1.1482E−05 | −1.2763E−06 | 0.0000E+00 | 0.0000E+00 |
| S12 | 2.1790E−03 | 5.6530E−04 | 0.0000E+00 | 0.0000E+00 |
| S13 | −1.3454E−04 | −3.3811E−05 | 0.0000E+00 | 0.0000E+00 |
| S14 | −1.4401E−04 | −2.4767E−05 | 0.0000E+00 | 0.0000E+00 |
| S15 | −1.6891E−04 | −6.7962E−05 | 0.0000E+00 | 0.0000E+00 |
| S16 | 8.0311E−04 | −1.0997E−05 | 0.0000E+00 | 0.0000E+00 |

Figure 22A:
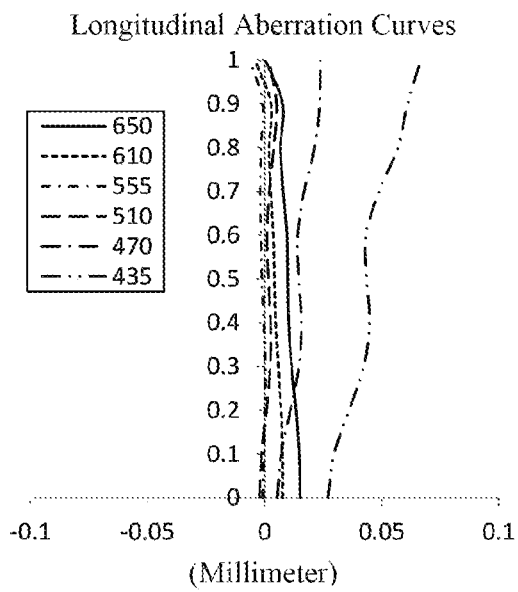
FIGS. 22A to 22C show longitudinal aberration curves, astigmatic curves, and a distortion curve, respectively, when the zoom lens group of Example 4 is in a wide-angle state.
Figure 22B:
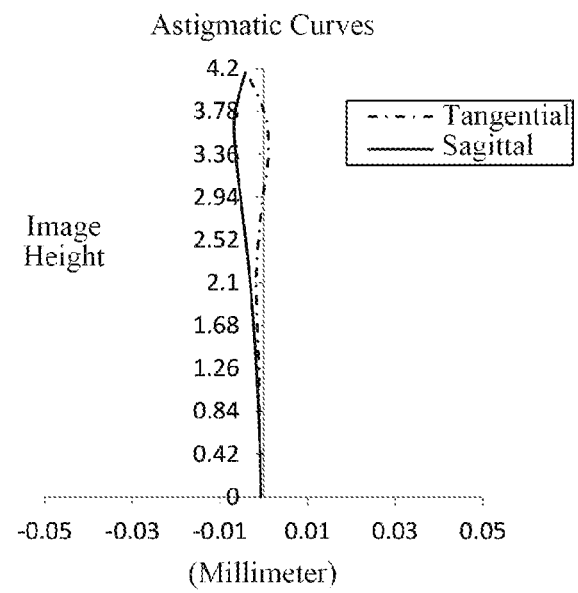
Figure 22C:
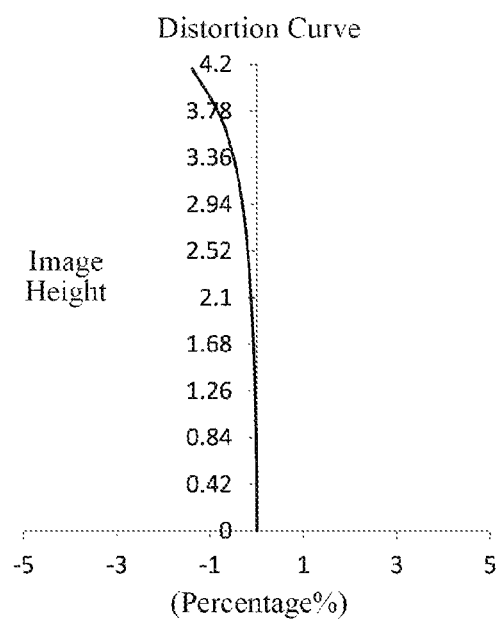
Figure 23A:
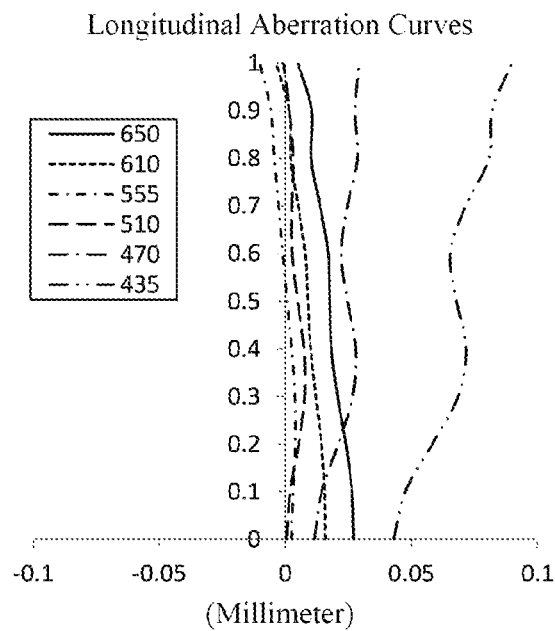
FIGS. 23A to 23C show longitudinal aberration curves, astigmatic curves, and a distortion curve, respectively, when the zoom lens group of Example 4 is in an intermediate state during a transition from a wide-angle state to a telephoto state.
Figure 23B:
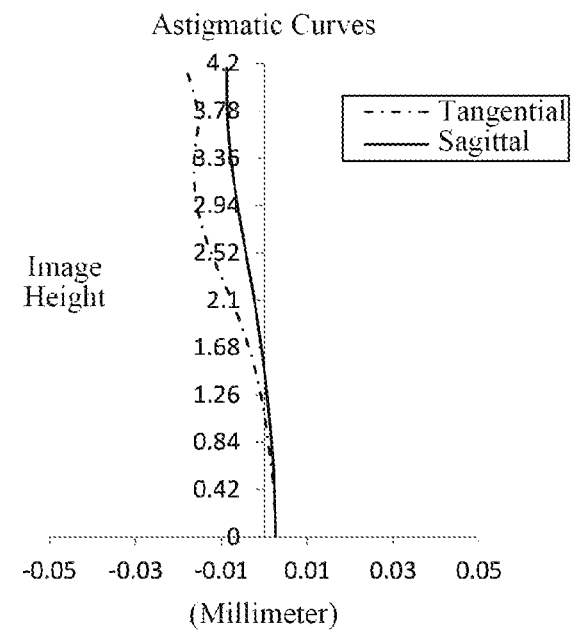
Figure 23C:
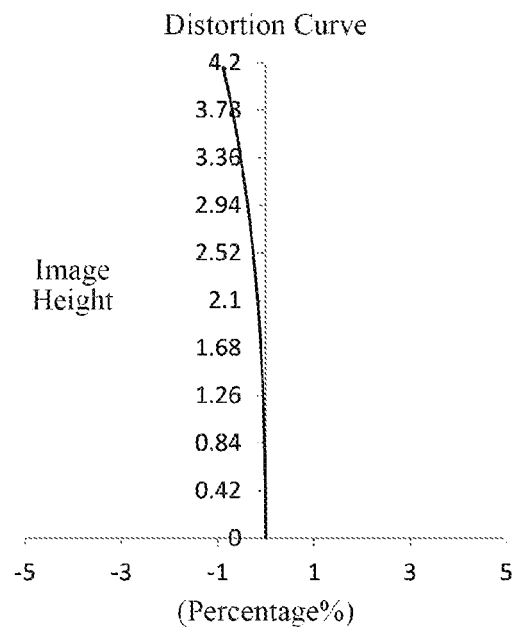
Figure 24A:
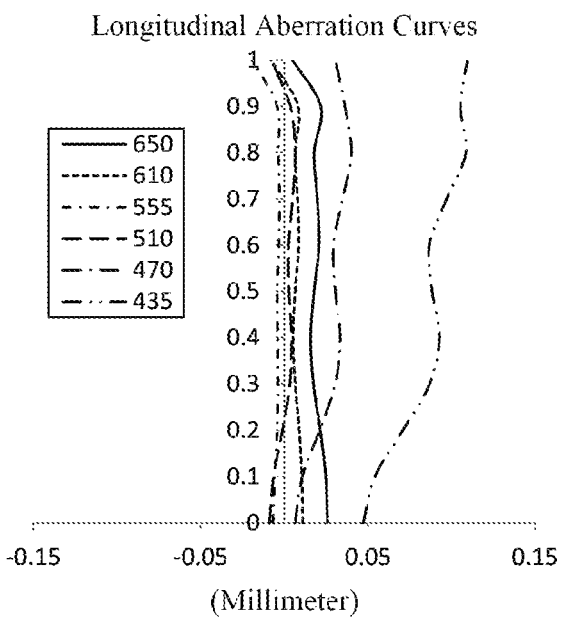
FIGS. 24A to 24C show longitudinal aberration curves, astigmatic curves, and a distortion curve, respectively, when the zoom lens group of Example 4 is in a telephoto state.
Figure 24B:
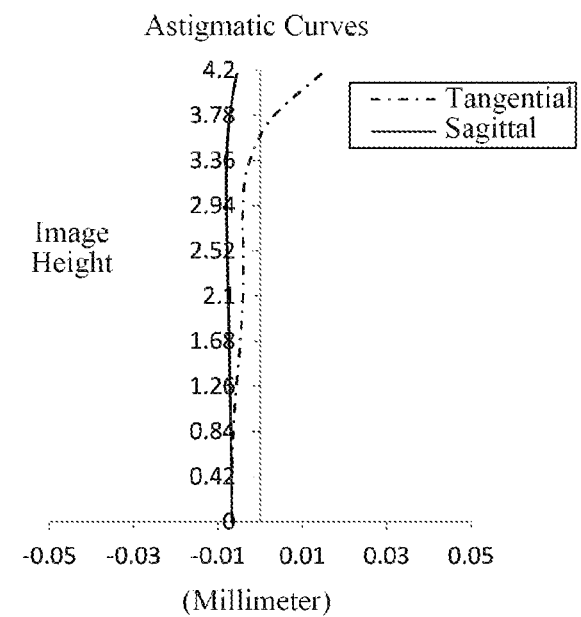
Figure 24C:
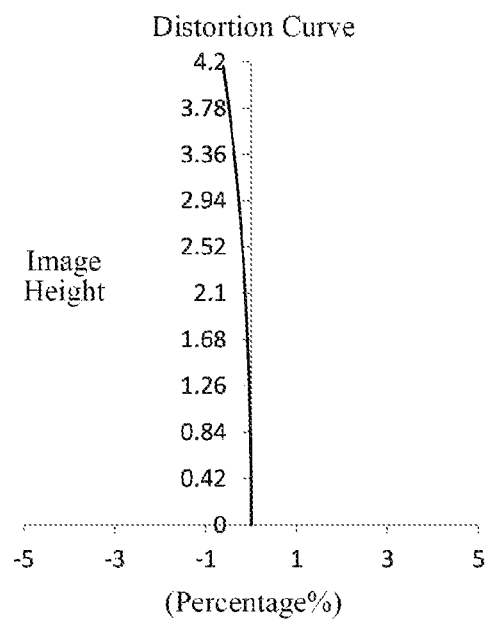

FIGS. 22A, 23A, and 24A show longitudinal aberration curves when the zoom lens group of Example 4 is in the wide-angle state, the intermediate state, and the telephoto state, respectively, representing the deviations of focal points converged by light of different wavelengths after passing through the lens assembly. FIGS. 22B, 23B, and 24B show astigmatic curves when the zoom lens group of Example 4 is in the wide-angle state, the intermediate state, and the telephoto state, respectively, representing the curvatures of a tangential plane and the curvatures of a sagittal plane. FIGS. 22C, 23C, and 24C show a distortion curve when the zoom lens group of the Example 4 is in the wide-angle state, the intermediate state, and the telephoto state, respectively, representing the amounts of distortion corresponding to different image heights. As can be seen from FIGS. 22A to 24C, the zoom lens group according to Example 4 can achieve good imaging quality in each state.

In summary, Examples 1 to 4 satisfy the relationships shown in Table 13, respectively.

TABLE 13

| | Example | | | |
|---|---|---|---|---|
| Conditional | 1 | 2 | 3 | 4 |
| TTL/fw | 2.19 | 2.21 | 2.09 | 2.10 |
| TTL/ft | 1.33 | 1.34 | 1.27 | 1.27 |
| 10 × fw/|fG1| | 0.00 | 0.02 | 0.37 | 0.38 |
| fG2/fw | 4.10 | 4.21 | 4.05 | 4.20 |
| fG3/|fw − ft| | 1.51 | 1.49 | 1.48 | 1.45 |
| fG3/fG4 | −1.11 | −1.11 | −1.07 | −1.07 |
| fG2/f23 | 2.08 | 2.10 | 2.09 | 2.14 |
| fG2/f45 | −1.19 | −1.22 | −1.21 | −1.28 |
| R3/R10 | −1.08 | −1.23 | −1.43 | −1.61 |
| R11/R12 | −1.83 | −1.56 | −1.64 | −1.57 |
| R15/R16 | −1.27 | −1.18 | −1.32 | −1.33 |
| ft/fw | 1.65 | 1.65 | 1.65 | 1.66 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the zoom lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A zoom lens group, sequentially from an object side to an image side of the zoom lens group along an optical axis, comprising:
 a first lens group;
 a second lens group;
 a third lens group having positive refractive power; and
 a fourth lens group having negative refractive power;
 wherein the zoom lens group continuously zooms by changing positions of the second lens group, the third lens group, and the fourth lens group along the optical axis,
 wherein a distance TTL from an object-side surface of a lens in the first lens group closest to the object side to an imaging plane of the zoom lens group along the optical axis, and a total effective focal length fw of the zoom lens group in a wide-angle state satisfy:

$$2.0 < TTL/fw < 3.0.$$

2. The zoom lens group according to claim 1, wherein the distance TTL from the object-side surface of the lens in the first lens group closest to the object side to the imaging plane of the zoom lens group along the optical axis, and the total effective focal length fw of the zoom lens group in the wide-angle state satisfy:

$$2.0 < TTL/fw < 2.5.$$

3. The zoom lens group according to claim 1, wherein the distance TTL from the object-side surface of the lens in the first lens group closest to the object side to the imaging plane of the zoom lens group along the optical axis, and a total effective focal length ft of the zoom lens group in a telephoto state satisfy:

$$1.0 < TTL/ft < 1.5.$$

4. The zoom lens group according to claim 1, wherein the total effective focal length fw of the zoom lens group in the wide-angle state and an effective focal length fG1 of the first lens group satisfy:

$10 \times fw/|fG1|<0.5$.

5. The zoom lens group according to claim 1, wherein the total effective focal length fw of the zoom lens group in the wide-angle state and an effective focal length fG2 of the second lens group satisfy:

$4.0<fG2/fw<4.5$.

6. The zoom lens group according to claim 1, wherein the total effective focal length fw of the zoom lens group in the wide-angle state, a total effective focal length ft of the zoom lens group in a telephoto state, and an effective focal length fG3 of the third lens group satisfy:

$1.4<fG3/|fw-ft|<1.6$.

7. The zoom lens group according to claim 1, wherein an effective focal length fG3 of the third lens group and an effective focal length fG4 of the fourth lens group satisfy:

$-1.5<fG3/fG4 \leq -1.0$.

8. The zoom lens group according to claim 1, wherein
the first lens group comprises a first lens;
the second lens group comprises a second lens, a third lens, a fourth lens, and a fifth lens;
the third lens group comprises a sixth lens; and
the fourth lens group comprises a seventh lens and an eighth lens.

9. The zoom lens group according to claim 8, wherein an effective focal length fG2 of the second lens group and a combined focal length f23 of the second lens and the third lens satisfy:

$2 \leq fG2/f23<2.5$.

10. The zoom lens group according to claim 8, wherein an effective focal length fG2 of the second lens group and a combined focal length f45 of the fourth lens and the fifth lens satisfy:

$-1.5<fG2/f45<-1.0$.

11. The zoom lens group according to claim 8, wherein a radius of curvature R3 of an object-side surface of the second lens and a radius of curvature R10 of an image-side surface of the fifth lens satisfy:

$-2.0<R3/R10 \leq -1.0$.

12. The zoom lens group according to claim 8, wherein a radius of curvature R11 of an object-side surface of the sixth lens and a radius of curvature R12 of an image-side surface of the sixth lens satisfy:

$-2.0<R11/R12<-1.0$.

13. The zoom lens group according to claim 8, wherein a radius of curvature R15 of an object-side surface of the eighth lens and a radius of curvature R16 of an image-side surface of the eighth lens satisfy:

$-1.5<R15/R16<-1.0$.

14. The zoom lens group according to claim 1, wherein the total effective focal length fw of the zoom lens group in the wide-angle state and a total effective focal length ft of the zoom lens group in a telephoto state satisfy:

$1.5<ft/fw<2.0$.

* * * * *